(12) United States Patent
Vosoughi et al.

(10) Patent No.: US 10,964,102 B2
(45) Date of Patent: Mar. 30, 2021

(54) ADAPTIVE SUB-BAND BASED CODING OF HIERARCHICAL TRANSFORM COEFFICIENTS OF THREE-DIMENSIONAL POINT CLOUD

(71) Applicant: SONY CORPORATION, Tokyo (JP)

(72) Inventors: Arash Vosoughi, San Jose, CA (US); Danillo Graziosi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 16/423,940

(22) Filed: May 28, 2019

(65) Prior Publication Data
US 2020/0013215 A1 Jan. 9, 2020

Related U.S. Application Data

(60) Provisional application No. 62/695,522, filed on Jul. 9, 2018.

(51) Int. Cl.
*G06T 17/00* (2006.01)
*G06T 9/00* (2006.01)
(Continued)

(52) U.S. Cl.
CPC .......... *G06T 17/005* (2013.01); *G06K 9/6211* (2013.01); *G06T 7/37* (2017.01); *G06T 9/007* (2013.01)

(58) Field of Classification Search
CPC .......... G06T 7/37; G06T 9/007; G06K 9/6211
See application file for complete search history.

(56) References Cited

U.S. PATENT DOCUMENTS

2011/0010400 A1* 1/2011 Hayes ................. H03M 7/3059
707/803
2015/0078440 A1 3/2015 Novotny
(Continued)

FOREIGN PATENT DOCUMENTS

EP 3047648 A1 7/2016
GB 2437579 A 10/2007
WO 2015/038510 A1 3/2015

OTHER PUBLICATIONS

Ma et al, "Adaptive Multiple Description Depth Image Coding Based on Wavelet Sub-band Coefficients", Advances in Intelligent Information Hiding and Multimedia Signal Processing. IIH-MSP Jul. 2017, vol. 82, pp. 34-41 (Year: 2017).*
(Continued)

*Primary Examiner* — Edward Park
(74) *Attorney, Agent, or Firm* — Chip Law Group

(57) ABSTRACT

An electronic apparatus and method for adaptive sub-band based coding of hierarchical transform coefficients of a 3D point cloud, is provided. The electronic apparatus stores the 3D point cloud and generates a plurality of voxels from the 3D point cloud. The electronic apparatus generates a plurality of hierarchical transform coefficients by application of a hierarchical transform scheme on the generated plurality of voxels and classifies the plurality of hierarchical transform coefficients into a plurality of sub-bands of hierarchical transform coefficients. The plurality of hierarchical transform coefficients are classified based on a weight of each of the plurality of hierarchical transform coefficients. The electronic apparatus further generates a plurality of quantized levels by application of a different quantization scheme of a set of different quantization schemes on each sub-band of hierarchical transform coefficients of the plurality of sub-
(Continued)

bands of hierarchical transform coefficients and encodes the generated plurality of quantized levels.

19 Claims, 11 Drawing Sheets

(51) Int. Cl.
*G06T 7/37* (2017.01)
*G06K 9/62* (2006.01)

(56) References Cited

U.S. PATENT DOCUMENTS

2016/0007023 A1 1/2016 Novotny
2017/0347122 A1* 11/2017 Chou ................. H04N 19/36

OTHER PUBLICATIONS

"Compression of 3D Point Clouds Using a Region-Adaptive Hierarchical Transform", IEEE Transactions on Image Processing, vol. 25, Issue 8, Aug. 2016, pp. 3947-3956.
International Search Report & Written Opinion for EP Application No. PCT/IB2019/055231, dated Nov. 4, 2019, 13 pages.
Nakagami, et al, "Second Working Draft for PCC Categories 1, 3", International Organization for Standardization, ISO/IEC JTC 1/SC 29/WG11, MPEG 2018/N17533, Coding of Moving Pictures and Audio, XP030196036, Apr. 2018, 48 pages.
Queiroz, et al., "Compression of 3D Point Clouds Using a Region-Adaptive Hierarchical Transform", IEEE Transactions on Image Processing, vol. 25, Issue 8, Aug. 2016, p. 3947-3956.
Vosoughi, et al, "PCC CE13.1—Sony's Proposal for TMC13 Sub-band Adaptive Quantization for RAHT", International Organization for Standardization, ISO/IEC JTC 1/SC 29/WG11, MPEG 2018/m44672, Coding of Moving Pictures and Audio, Oct. 2018, 8 pages.

* cited by examiner

ADAPTIVE SUB-BAND BASED CODING OF HIERARCHICAL TRANSFORM COEFFICIENTS OF THREE-DIMENSIONAL POINT CLOUD

CROSS-REFERENCE TO RELATED APPLICATIONS/INCORPORATION BY REFERENCE

This application claims priority to U.S. Provisional Patent Application Ser. No. 62/695,522 filed on Jul. 9, 2018, the entire content of which is hereby incorporated herein by reference.

FIELD

Various embodiments of the disclosure relate to three-dimensional (3D) point cloud compression (PCC). More specifically, various embodiments of the disclosure relate to adaptive sub-band based coding of hierarchical transform coefficients of 3D point cloud.

BACKGROUND

Advancements in the field of three-dimensional (3D) scanning technologies have provided the ability to create 3D geometrical representations of 3D objects. 3D point clouds are one example of the 3D geometrical representations, which are increasingly adopted for different applications, such as free viewpoint display for sports or a live event relay broadcasting, geographic information systems, cultural heritage representations, or autonomous navigation of vehicles. Typically, 3D point clouds include a large number of unstructured 3D points (e.g., each point having X, Y, and Z coordinates) along with associated attributes, for example, texture including colors or reflectance. A 3D image of an object described by a 3D point cloud may contain order of magnitudes of raw data, which makes data storage, processing, and transmission a challenging task for any practical application. Thus, it may be desirable to have an efficient point cloud compression technology. To achieve this desirable compression, conventional PCC methods rely on a transform of the 3D point cloud to generate coefficients that represent attributes of the 3D point cloud. Typically, the generated coefficients include low pass coefficients and high pass coefficients. Conventionally, some of the lowest-weighted coefficients from the generated coefficients are set to zero to achieve a desirable compression. However, the conventional techniques do not explore other high frequency coefficients (i.e. low weighted coefficients) whose frequency content may have almost no significant contribution to the 3D point cloud and whose contribution to visual attributes may be unnoticeable to a user. This may lead to less efficient compression of the 3D point cloud.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for adaptive sub-band based coding of hierarchical transform coefficients of three-dimensional (3D) point cloud is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for adaptive sub-band based coding of hierarchical transform coefficients of a three-dimensional (3D) point cloud. The 3D point cloud may be a dynamic 3D point cloud or a static 3D point cloud. Exemplary aspects of the electronic apparatus that may include a memory configured to store the 3D point cloud associated with at least one object in a 3D space. The electronic apparatus may be configured to generate a plurality of voxels from the stored 3D point cloud. The electronic apparatus may be configured to generate a plurality of hierarchical transform coefficients by application of a hierarchical transform scheme on the generated plurality of voxels. The electronic apparatus may be further configured to classify the plurality of hierarchical transform coefficients into a plurality of sub-bands of hierarchical transform coefficients. The plurality of hierarchical transform coefficients may be classified based on a weight of each of the plurality of hierarchical transform coefficients. The electronic apparatus may be further configured to generate a plurality of quantized levels by application of a different quantization scheme from a set of different quantization schemes on each of the plurality of sub-bands of hierarchical transform coefficients. Due to an adaptive application of the different quantization scheme on each of the plurality of sub-bands of hierarchical transform coefficients, the 3D point cloud is quantized in a manner such that a higher compression ratio is achieved, as compared to the conventional PCC coding methods, without much loss of a visual quality in a reconstructed object. Also, the compression of the 3D point cloud may require less processing power and less bandwidth for transmission of the 3D point cloud to external devices.

Figure 1:
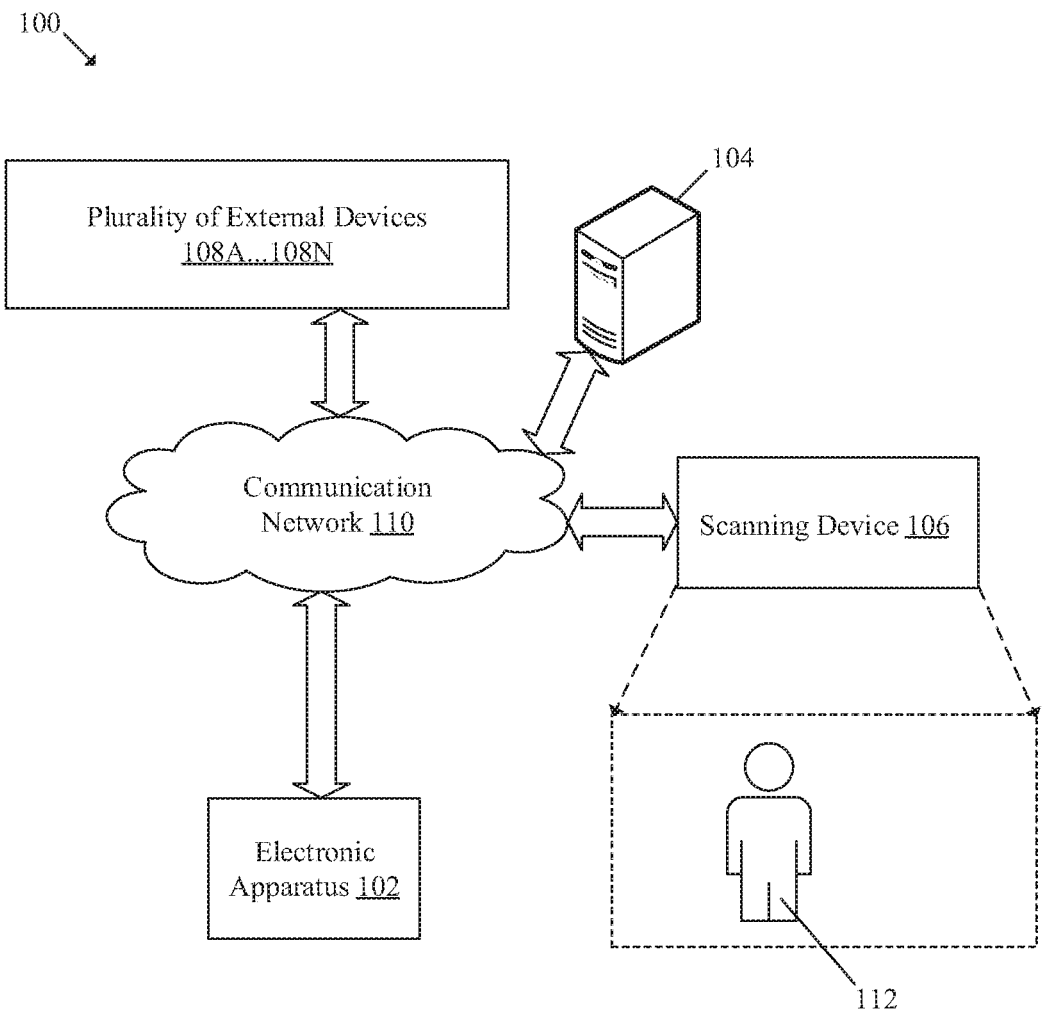
FIG. 1 is a block diagram that illustrates an exemplary environment for an exemplary electronic apparatus that handles adaptive sub-band based coding of hierarchical transform coefficients of a 3D point cloud, in accordance with an embodiment of the disclosure.

FIG. 1 is a block diagram that illustrates an exemplary environment for an exemplary electronic apparatus that handles adaptive sub-band-based coding of hierarchical transform coefficients of a 3D point cloud, in accordance with an embodiment of the disclosure. With reference to FIG. 1, there is shown a network environment 100. The network environment 100 may include an electronic apparatus 102, a server 104, a scanning device 106, and a plurality of external devices 108A . . . 108N. The scanning device 106 may further include an image sensor 106A and a depth sensor 106B. The electronic apparatus 102 may be communicatively coupled to the server 104, the scanning device 106, and the plurality of external devices 108A . . . 108N, via a communication network 110. There is further shown an object 112 in a field-of-view (FOV) of the scanning device 106.

The electronic apparatus 102 may comprise suitable logic, circuitry, interfaces, and/or code that may be configured to encode and/or decode a 3D point cloud. The 3D point cloud may include a plurality of feature points that together represent the object in the 3D space. As an example, each feature point may be represented as (x, y, z, r, g, b, α), where (x, y, z) represent 3D coordinates of a point on the object, (r, g, and b) represent red, green, and blue values of the point, and (α) may represent the transparency value. In some embodiments, the electronic apparatus 102 may be configured to generate the 3D point cloud of an object (such as the object 112) in a 3D space. In accordance with an embodiment, instead of a single object, the electronic apparatus 102 may be configured to generate the 3D point cloud of a plurality of objects in the 3D space. Examples of the electronic apparatus 102 may include, but are not limited to, a computing device, a video-conferencing system, an augmented reality (AR) device, a virtual reality (VR device), a mixed reality (MR) device, a game console, a smart wearable device, a mainframe machine, a server, a computer work-station, and/or a consumer electronic (CE) device.

The server 104 may comprise suitable logic, circuitry, interfaces, and/or code that may be configured to generate the 3D point cloud of an object (such as the object 112). The server 104 may be further configured to store the generated 3D point cloud. Also, in some embodiments, the server 104 may be a media server or a gaming server that may stream media content (that may include the 3D point cloud) for playback on the electronic apparatus 102. Examples of the server 104 may include, but are not limited to, an application server, a cloud server, a web server, a database server, a file server, a gaming server, a mainframe server, or a combination thereof.

The scanning device 106 may comprise suitable logic, circuitry, interfaces, and/or code that may be configured to generate a 3D point cloud of an object (such as the object 112) in the 3D space. In accordance with an embodiment, the scanning device 106 may be configured to capture a plurality of color images and corresponding depth information of an object (such as the object 112). The plurality of color images and the corresponding depth information of the object may be captured from different viewing angles. In such cases, the 3D point cloud may be generated based on the captured plurality of color images and the captured corresponding depth information of the object. The scanning device 106 may be configured to capture the plurality of color images of the object in real time, near-real time, or after a certain lag.

In accordance with another embodiment, the scanning device 106 may be configured to execute a 3D scan of an object (such as the object 112) in the 3D space and generate a dynamic 3D point cloud that may include changes in different attributes and geometry of the feature points in the dynamic 3D point cloud at different time-steps. The scanning device 106 may be configured to communicate the generated 3D point cloud and/or plurality of color images and corresponding depth information to the electronic apparatus 102, via the communication network 110.

The scanning device 106 may include a plurality of sensors, such as a combination of a depth sensor, a color sensor, (such as a red-green-blue (RGB) sensor), and/or an infrared (IR) sensor that may capture the plurality of color images or a 3D video of an object (such as the object 112) from the different viewing angles. In accordance with an embodiment, the scanning device 106 may include an active 3D scanner that relies on radiations or light to capture a 3D structure of an object in the 3D space. Also, the scanning device 106 may include an image sensor that may capture color information associated with the object. For example, the active 3D scanner may be a time-of-flight (TOF)-based 3D laser scanner, a laser range-finder, a TOF camera, a hand-held laser scanner, a structured light 3D scanner, a modulated light 3D scanner, a CT scanner that outputs point cloud data, an aerial Light Detection And Ranging (LiDAR) laser scanner, a 3D LiDAR, a 3D motion sensor, and the like.

In FIG. 1, the scanning device 106 is shown as a separate device from the electronic apparatus 102. However, the disclosure may not be so limited and in some embodiments, the scanning device 106 may be integrated with the electronic apparatus 102. Alternatively, the entire functionality of the scanning device 106 may be incorporated in the electronic apparatus 102, without deviating from the scope of the present disclosure. Examples of the scanning device 106 may include, but are not limited to, a depth sensor, an RGB sensor, an IR sensor, an image sensor, and/or a motion-detector device.

Each of the plurality of external devices 108A . . . 108N may comprise suitable logic, circuitry, interfaces, and/or code that may be configured to communicate with the electronic apparatus 102, via the communication network 110. In accordance with an embodiment, each of the plurality of external devices 108A . . . 108N may be configured to receive a compressed 3D point cloud (as multimedia content) from the electronic apparatus 102, via the communication network 110. The plurality of external devices 108A . . . 108N may be further configured to render the received multimedia content. Examples of the plurality of external devices 108A . . . 108N may include, but are not limited to, a display system, a computing device, a gaming device, a mobile phone, a television, or an electronic device with capability to store or render the multimedia content.

The communication network 110 may include a communication medium through which the electronic apparatus 102 may be communicatively coupled to the server 104, the scanning device 106, and the plurality of external devices 108A . . . 108N. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In operation, the electronic apparatus 102 may be configured to store a 3D point cloud. The 3D point cloud may be generated from the plurality of color images and corresponding depth information of an object (such as the object 112). In accordance with an embodiment, the scanning device 106 may be configured to generate the 3D point cloud of an object in FOV of the scanning device 106. The scanning device 106 may be configured to capture the plurality of color images and the corresponding depth information of the object 112 from different viewing angles. The image sensor 106A of the scanning device 106 may be configured to capture the plurality of color images of the object. The depth sensor 106B may be configured to capture the corresponding depth information of the object at the time of capture of the plurality of color images. The captured depth information of the object may include information about "Z" coordinates of the object.

In accordance with an embodiment, the server 104 may be configured to receive the plurality of color images and the corresponding depth information of the object from the scanning device 106, via the communication network 110. The server 104 may be further configured to generate the 3D point cloud based on the received plurality of color images and the corresponding depth information. The server 104 may be configured to store the generated 3D point cloud. In such cases, the electronic apparatus 102 may be configured to receive the generated 3D point cloud from the server 104, via the communication network 110.

In accordance with an embodiment, the electronic apparatus 102 may be configured to receive a plurality of color images and the corresponding depth information from the scanning device 106, via the communication network 110. The electronic apparatus 102 may be further configured to generate the 3D point cloud based on the received plurality of color images and the corresponding depth information.

In accordance with another embodiment, the 3D point cloud may be generated using 3D scanning techniques that may be known to one ordinarily skilled in the art. The 3D point cloud includes 3D coordinates of feature points of an object in the 3D space. The 3D point cloud may include a large number of feature points usually in a 3D coordinate system (such as a Cartesian system defined by "X, Y, and Z" coordinates). The 3D point cloud may be generated to capture at least a surface of an object. In some cases, for a transparent or a semi-transparent object, the 3D point cloud may also capture inner solid features of an object in addition to the surface of the object.

The 3D point cloud may be a representation of geometrical information (e.g., the 3D coordinates) and attribute information of an object (such as the object 112) in the 3D space. The attribute information may include, but is not limited to, color information, reflectance information, or texture information associated with the object in the 3D space. The texture information represents spatial arrangement of colors or intensities in the plurality of color images of the object. The reflectance information may represent information associated with an empirical model (e.g., a Phong shading model or a Gouraud Shading model) of a local illumination of feature points of the 3D point cloud. The empirical model of the local illumination may correspond to a reflectance (rough or shiny surface portions) on a surface of the object. In accordance with an embodiment, the 3D point cloud may a dynamic 3D point cloud that may be generated based on a plurality of image frames of the captured 3D video of the object in the 3D space.

The electronic apparatus 102 may be further configured to generate a plurality of voxels from the 3D point cloud. The generation of the plurality of voxels from the 3D point cloud may correspond to a voxelization of the 3D point cloud. Conventional techniques to voxelize a 3D point cloud may be known to one ordinarily skilled in the art. Thus, the details of the voxelization is omitted from the disclosure for the sake of brevity. Since the 3D point cloud includes a large number of data points, a substantial amount of bandwidth for transmission and a substantial storage space may be required. Thus, the 3D point cloud may be encoded such that the 3D point cloud is compressed in a manner that requires less bandwidth for transmission and less storage space.

The geometrical information and the attribute information included in the 3D point cloud may be separately encoded. In order to encode the geometrical information, spatial position of individual voxels in the 3D space may need to be represented in a data structure that can be reconstructed to estimate position of the individual voxels in 3D space. An example of a technique used to encode the geometrical information is Octree-based geometry encoding in which the plurality of voxels are arranged on an Octree as a hierarchical data structure. The hierarchical data structure may be indicative of a 3D geometrical representation of the plurality of voxels in the 3D space. The hierarchical data structure may further represent the plurality of voxels in a tree structure that includes a root node and a plurality of leaf nodes in a hierarchical manner, based on the geometrical information of the plurality of voxels in the 3D space.

The electronic apparatus 102 may be further configured to encode the attribute information that may include at least one of the color information, the texture information, or the reflectance information associated with the object. The process for encoding the attribute information is described herein. The electronic apparatus 102 may be configured to apply a hierarchical transform scheme on the plurality of voxels to generate a plurality of hierarchical transform coefficients. An example of the hierarchical transform scheme is Regional Adaptive Hierarchical Transform (RAHT) scheme. The plurality of hierarchical transform coefficients may correspond to the attribute information associated with the plurality of voxels. The plurality of voxels may be positioned at different locations in the 3D space. Some of the plurality of voxels may be grouped at the different locations in the 3D space. The plurality of hierarchical transform coefficients may be associated with position of the plurality of voxels in the 3D space. Each of the plurality of voxels in the hierarchical data structure may be assigned with a weight. Further, each of the plurality of hierarchical transform coefficients of the plurality of voxels may be associated with a weight, where the weight of each of the plurality of hierarchical transform coefficients may be updated as different pairs of voxels are selected using the hierarchical data structure for application of the hierarchical transform scheme. The weight of each of the plurality of hierarchical transform coefficients may be associated with a density of the plurality of voxels at the different locations of the 3D space. Further, the plurality of hierarchical transform coefficients may include high frequency transform coefficients and low frequency transform coefficients. The low frequency coefficient may carry higher weight as compared to the weight associated with the plurality of high frequency coefficients.

The electronic apparatus 102 may be further configured to classify the plurality of hierarchical transform coefficients into a plurality of sub-bands of hierarchical transform coefficients, based on the weight of each of the plurality of hierarchical transform coefficients. The classification of the plurality of hierarchical transform coefficients may help the electronic apparatus 102 to selectively apply a different quantization scheme on each sub-band of hierarchical transform coefficients of the plurality of sub-band of hierarchical transform coefficients. Also, this may help to selectively suppress hierarchical transform coefficients in individual The details of the classification of the plurality of hierarchical transform coefficients is provided in detail, for example, in FIGS. 3A and 3B.

The electronic apparatus 102 may be further configured to quantize the plurality of sub-bands of hierarchical transform coefficients. The electronic apparatus 102 may be configured to select a different quantization scheme from a set of different quantization schemes for each sub-band of hierarchical transform coefficients of the plurality of sub-bands of hierarchical transform coefficients. The different quantization scheme may correspond to at least a sub-band specific dead zone, a step size for quantization, a number of quantization levels, and a specific relationship between a quantization level and each coefficient from the each of the plurality of sub-bands of hierarchical transform coefficients. The set of different quantization schemes may be stored on the server 104 or in the memory (not shown) of the electronic apparatus 102. The electronic apparatus 102 may be further configured to generate a plurality of quantized levels by application of the different quantization scheme on each sub-band of hierarchical transform coefficients of the plurality of sub-bands of the hierarchical transform coefficients. The application of the different quantization scheme from the set of different quantization schemes has been described in detail, for example, in FIGS. 3A and 3B.

The electronic apparatus 102 may be further configured to encode the generated plurality of quantized levels. The electronic apparatus 102 may be configured to encode the plurality of quantized levels by entropy coding of the 3D point cloud. The entropy coding of the point cloud may result is a lossy compression of the 3D point cloud. The electronic apparatus 102 may be configured to generate a bit-stream of coded voxel attributes by encoding the generated plurality of quantized levels. The electronic apparatus 102 may be further configured to transmit the generated bit-stream of coded voxel attributes to at least one of the plurality of external devices 108A . . . 108N. Also, in some embodiments, the electronic apparatus 102 may be configured to transmit supplemental information that may help to decode the bit-stream of the coded voxel attributes and/or the bit-stream of coded voxel geometry. Examples for the supplemental information are provided in FIG. 3B. In accordance with an embodiment, the compressed 3D point cloud may be the dynamic 3D point cloud. In accordance with an embodiment, the bit-stream of the coded voxel attributes and the bit-stream of coded voxel geometry may be bundled with encoded blocks of conventional image-based media, such as a two dimensional (2D) image-based video.

By classification the plurality of sub-bands of hierarchical transform coefficients and generation of the plurality of quantized levels, the 3D point cloud may be adaptively encoded. Accordingly, the encoded 3D point cloud may result in a compressed 3D point cloud that may require less processing power and less transmission bandwidth to transmit the 3D point cloud to the at least one of the plurality of external devices 108A . . . 108N. Such adaptive approach enables the electronic apparatus 102 to achieve higher compression ratio than the compression ratio from the conventional 3D point cloud compression (PCC) methods. Further, in case of the dynamic 3D point cloud, a fast processing can be achieved to compress 3D scans (as dynamic 3D point clouds) by generating the plurality of hierarchical transform coefficients from the dynamic 3D point cloud and adaptively encoding the 3D dynamic point cloud.

Figure 2:
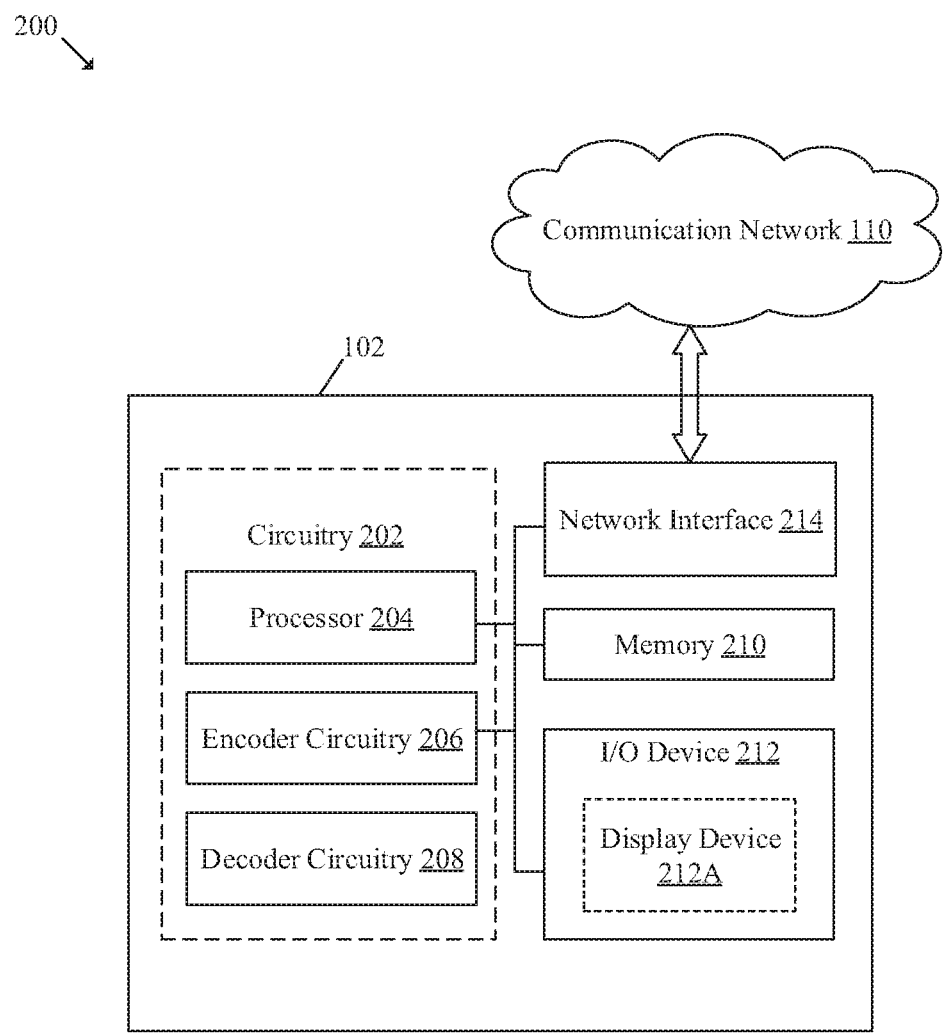
FIG. 2 is a block diagram that illustrates the exemplary electronic apparatus of FIG. 1, in accordance with an embodiment of the disclosure.

FIG. 2 is a block diagram that illustrates the exemplary electronic apparatus of FIG. 1, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202. The circuitry may include a processor 204 and an encoder circuitry 206. In some embodiments, the circuitry 202 may also include a decoder circuitry 208. The electronic apparatus 102 may further include a memory 210, an input/output (I/O) device 212, and a network interface 214. The I/O device 212 may include a display device 212A which may be utilized to render multimedia content, such as the 3D point cloud or a 3D graphic model rendered from the 3D point cloud. The circuitry 202 may be communicatively coupled to the memory 210, the I/O device 212, and the network interface 214. The circuitry 202 may be configured to communicate with the server 104, the scanning device 106, and the plurality of external devices 108A . . . 108N by use of the network interface 214.

The processor 204 may comprise suitable logic, circuitry, and/or interfaces that may be configured to execute instructions associated with the encoding of the 3D point cloud of an object (such as the object 112). Also, the processor 204 may be configured to execute instructions associated with generation of the 3D point cloud of the object in the 3D space and/or reception of the plurality of color images and the corresponding depth information. The processor 204 may be further configured to execute various operations related to transmission and/or reception of the 3D point cloud (as the multimedia content) to and/or from at least one of the plurality of external devices 108A . . . 108N. Examples of the processor 204 may be a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, a co-processor, other processors, and/or a combination thereof. In accordance with an embodiment, the processor 204 may be configured to assist the encoder circuitry 206 to encode the 3D point cloud and the decoder circuitry 208 to decode the encoded 3D point cloud and other functions of the electronic apparatus 102.

The encoder circuitry 206 may comprise suitable logic, circuitry, and/or interfaces that may be configured to encode the 3D point cloud corresponding to the object in the 3D space. In some embodiments, the geometrical information and the attribute information may be separately encoded by the encoder circuitry 206. The encoder circuitry 206 may be configured to generate a bit-stream of coded voxel attributes by application of an encoding scheme on the 3D point cloud. The bit-stream of coded voxel attributes may represent the attribute information corresponding to the 3D point cloud of the object. The application of the encoding scheme may include a sequential application of a hierarchical transform scheme, which is followed by a set of different quantization schemes, and an entropy coding scheme on the 3D point cloud or a voxelized 3D point cloud. The voxelized 3D point cloud may include a plurality of voxels corresponding to the plurality of feature points of the 3D point cloud. The plurality of voxels may also represent the attribute information and the geometrical information of the object in the 3D space.

In some embodiments, the encoder circuitry 206 may be further configured to execute various operations related to the generation of the 3D point cloud of the object in the 3D space and/or voxelization of the 3D point cloud. In certain embodiments, the encoder circuitry 206 is configured to manage storage of the bit-stream of coded voxel attributes in the memory 210 and/or transfer of the bit-stream of coded voxel attributes to other media devices (e.g., a portable media player), via the communication network 108.

In some embodiments, the encoder circuitry may be implemented as a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, a co-processor, other processors, and/or a combination thereof. In other embodiments, the encoder circuitry 206 may be implemented as a specialized hardware encoder interfaced with other computational circuitries of the electronic apparatus 102. In such implementation, the encoder circuitry 206 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with an embodiment, the encoder circuitry 206 may be also interfaced with a graphical processing unit (GPU) to parallelize operations of the encoder circuitry 206. In accordance with another embodiment, the encoder circuitry 206 may be implemented as a combination of programmable instructions stored in the memory 210 and logical units (or programmable logic units) on a hardware circuitry of the electronic apparatus 102.

The decoder circuitry 208 may comprise suitable logic, circuitry, and/or interfaces that may be configured to decode encoded information that may represent the attribute information and/or the geometrical information of the object. The encoded information may also include supplemental information, for example, coding tables, weight information, index values for geometrical information and quantization parameters, to assist the decoder circuitry 208. As an example, the encoded information may include the bit-stream of coded voxel attributes and/or a bit-stream of coded voxel geometry. Also, the decoder circuitry 208 may be configured to execute various operations related to a reception of the encoded information, such as the bit-stream of coded voxel attributes. The decoder circuitry 208 may be configured to reconstruct the 3D point cloud by application of a decoding scheme on the bit-stream of coded voxel attributes. The application of the decoding scheme may include a sequential application of an inverse entropy decoding scheme, which is followed by a set of different inverse quantization schemes, and an inverse hierarchical transform scheme on the bit-stream of coded voxel attributes. Also, the decoder circuitry 208 may be configured to reconstruct the 3D point cloud by decoding the bit-stream of coded voxel geometry in the 3D space.

The decoder circuitry 208 may be an entropy decoder configured to apply the entropy decoding scheme on the bit-stream of coded voxel attributes. Examples of the entropy decoding scheme may include Huffman decoding, arithmetic decoding, run-length Golomb-Rice decoding, and the like. The decoder circuitry 208 may be configured to reconstruct the object from the reconstructed 3D point cloud. In accordance with an embodiment, the decoding circuitry 208 may be also present in at least one of the plurality of external device 108A . . . 108N.

The memory 210 may comprise suitable logic, circuitry, and/or interfaces that may be configured to store instructions executable by the circuitry 202. The memory 210 may be configured to store operating systems and associated applications. The memory 210 may be further configured to store the 3D point cloud corresponding to the object (such as the object 112). In accordance with an embodiment, the memory 210 may be configured to store the set of different quantization schemes that may be utilized to generate a plurality of quantized levels. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 212 may comprise suitable logic, circuitry, interfaces, and/or code that may be configured to receive a user input. The I/O device 212 may be further configured to provide an output in response to the user input. The I/O device 212 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 212A and/or a speaker.

The display device 212A may comprise suitable logic, circuitry, interfaces, and/or code that may be configured to render the 3D point cloud onto a display screen of the display device 212A. In accordance with an embodiment, the display device 212A may include a touch screen to receive the user input. The display device 212A may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 212A may refer to a display screen of smart-glass device, a 3D display, a see-through display, a projection-based display, an electro-chromic display, and/or a transparent display.

The network interface 214 may comprise suitable logic, circuitry, interfaces, and/or code that may be configured to establish a communication between the electronic apparatus 102, the server 104, the scanning device 106, and the plurality of external devices 108A . . . 108N, via the communication network 110. The network interface 214 may be implemented by use of various known technologies to support wired or wireless communication of the electronic apparatus 102 with the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS). The operation of the circuitry 202 is described in detail, for example, in FIGS. 3A, 3B, and 5.

Figure 3A:
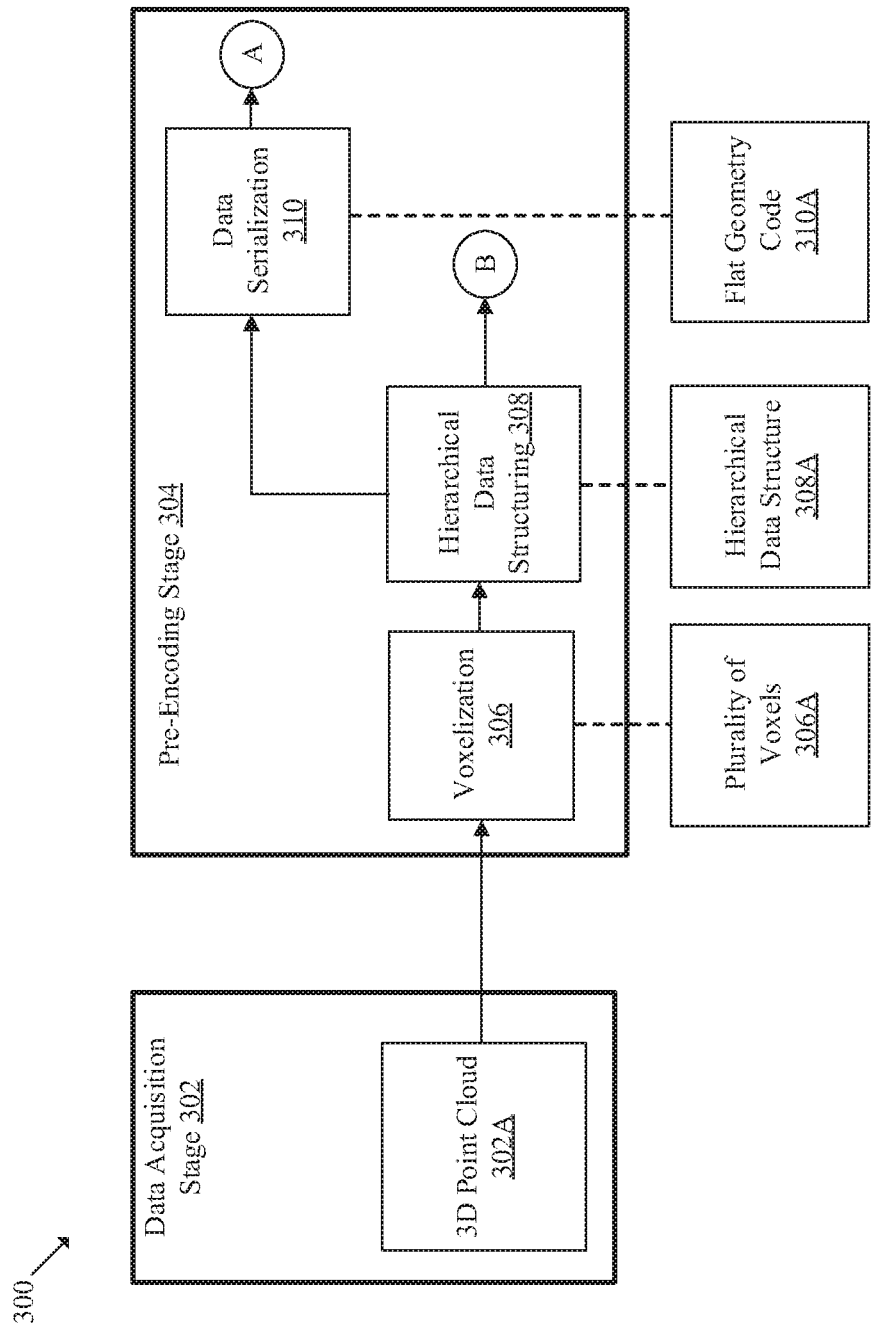
FIGS. 3A and 3B, collectively, illustrate an exemplary processing pipeline for adaptive sub-band based coding of hierarchical transform coefficients of the 3D point cloud, in accordance with an embodiment of the disclosure.
Figure 3B:
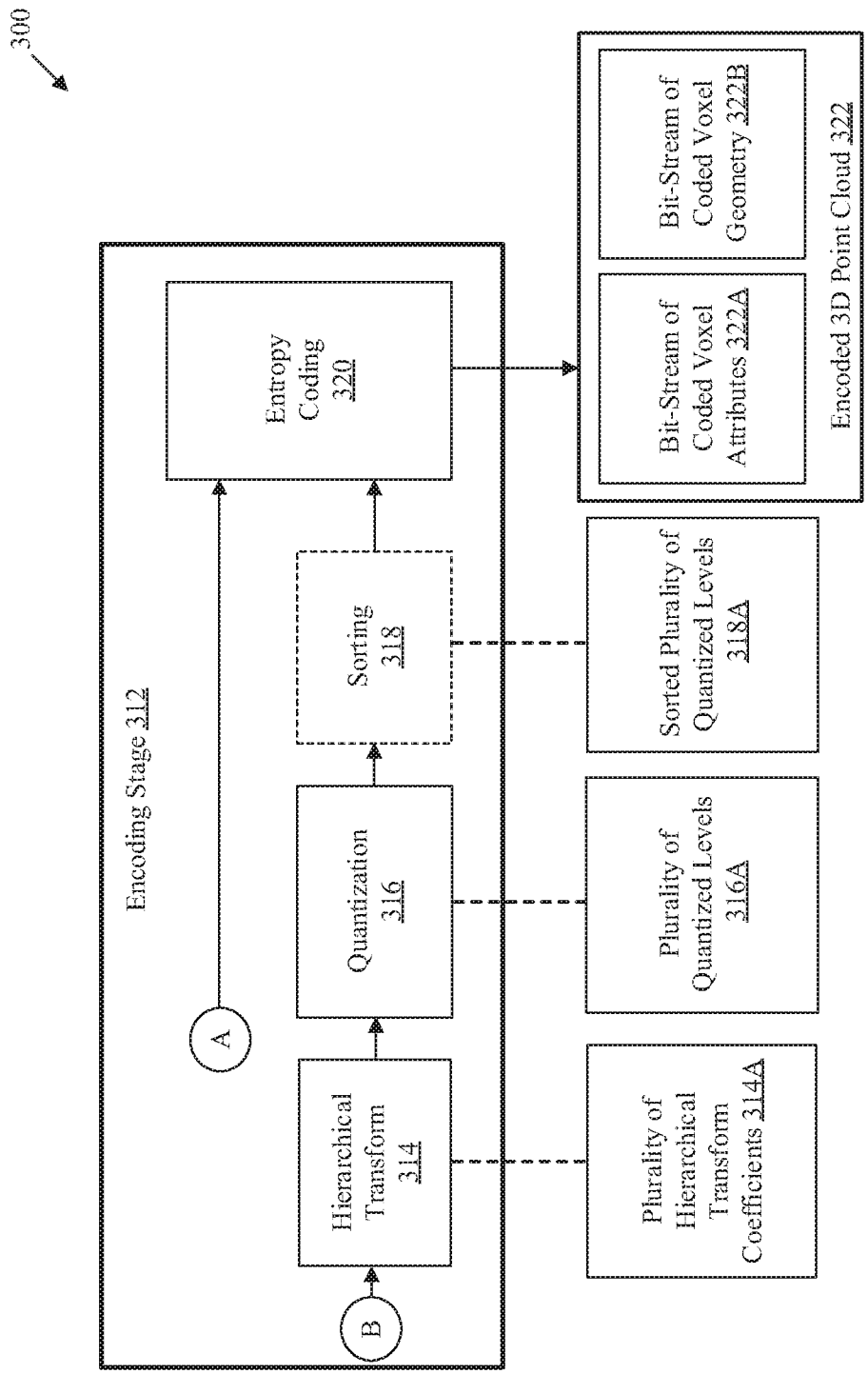

FIGS. 3A and 3B, collectively, illustrate an exemplary processing pipeline for adaptive sub-band based coding of hierarchical transform coefficients of the 3D point cloud, in accordance with an embodiment of the disclosure. FIGS. 3A and 3B are collectively explained in conjunction with elements from FIG. 1 and FIG. 2. With reference to FIGS. 3A and 3B, there is shown a processing pipeline 300 for adaptive sub-band based coding of hierarchical transform coefficients. In the processing pipeline 300, there is shown a sequence of operations that may start from 302 and end at 320. The sequence of operations may be executed by the circuitry 202 of the electronic apparatus 102. There is also shown outputs obtained at the individual stages of operation.

At data acquisition stage 302, a data acquisition operation may be executed. In the data acquisition operation, the processor 204 may be configured to acquire a 3D point cloud 302A that may correspond to one or more objects (such as the object 112) in the 3D space. The 3D point cloud 302A may be a representation of geometrical information and attribute information of the one or more objects in the 3D space. The geometrical information may be indicative of 3D coordinates (such as xyz coordinates) of individual feature points of the 3D point cloud 302A. The attribute information may include, but is not limited to, color information, reflectance information, and texture information of the one or more objects. The 3D point cloud 302A may be received from the scanning device 106, via the communication network 110 or directly acquired from an in-built scanner that may have same functionalities as that of the scanning device 106.

For example, a feature point in the 3D point cloud 302A may be represented as (x, y, z, Y, Cb, Cr, α), where (x, y, z) may be 3D coordinates that may represent geometrical information. Similarly, (Y, Cb, Cr) may be luma, chroma-blue difference, and chroma-red difference components (in YCbCr or YUV color space), respectively, of the feature point. Also, α may be a transparency value of the feature point in the 3D point cloud 302A. (Y, Cb, Cr, α) may represent the attribute information of the feature point in the 3D point cloud 302A.

In accordance with an embodiment, the processor 204 may be configured to generate the 3D point cloud 302A corresponding to the one or more objects in the 3D space. In such a case, the 3D point cloud 302A may be generated from raw object information that may include attribute information and depth information of the one or more objects. In accordance with another embodiment, the processor 204 may be configured to acquire color information (such as a plurality of color images) and corresponding depth information of the one or more objects. The color information and the corresponding depth information may be acquired from the scanning device 106. Alternatively, the processor 204 may be configured to capture color information (such as the plurality of color images) and corresponding depth information of the one or more objects. In such a case, the processor 204 may be configured to generate the 3D point cloud 302A corresponding to the one or more objects in the 3D space, based on the captured color information and corresponding depth information of the one or more objects.

At pre-encoding stage 304, pre-encoding stage operations may be executed. The pre-encoding stage operations may include a plurality of operations from 306 to 310 that may be executed by the encoder circuitry 206. At 306, a voxelization operation may be executed on the 3D point cloud 302A. In the voxelization operation, the encoder circuitry 206 may be configured to generate a plurality of voxels 306A from the 3D point cloud 302A. Each generated voxel may represent a volumetric element of one or more objects in 3D space. The volumetric element may be indicative of attribute information and geometrical information corresponding to a group of feature points of the 3D point cloud 302A.

An example of the process of voxelization for the 3D point cloud 302A is presented herein. The 3D space corresponding to the 3D point cloud 302A may be considered as a cube that may be recursively partitioned into a plurality of sub-cubes (such as octants). The size of each sub-cube may be based on the density of the plurality of feature points in the 3D point cloud 302A. The plurality of feature points of the 3D point cloud 302A may occupy different sub-cubes of the plurality of sub-cubes. Each sub-cube may correspond to a voxel and may contain a set of feature points of the 3D point cloud 302A, within a specific volume of the corresponding sub-cube. The encoder circuitry 206 may be configured to compute an average of the attribute information associated with set of feature points of the corresponding voxel. Also, the encoder circuitry 206 may be configured to compute center coordinates for each voxel of the plurality of voxels 306A based on the geometrical information associated with the corresponding set of feature points within the corresponding voxel. Each voxel of the generated plurality of voxels 306A may be represented by the center coordinates and the average of the attribute information associated with the corresponding set of feature points.

In accordance with an embodiment, the process of voxelization of the 3D point cloud 302A may be done using conventional techniques that may be known to one ordinarily skilled in the art. Thus, the details of the conventional techniques are omitted from the disclosure for the sake of brevity. The plurality of voxels 306A may represent geometrical information and the attribute information of the one or more objects in the 3D space. The plurality of voxels 306A may include occupied voxels and unoccupied voxels. The unoccupied voxels may not represent the attribute information of the one or more objects in the 3D space. Only the occupied voxels may represent the attribute information (such as color information) of the one or more objects. In accordance with an embodiment, the encoder circuitry 206 may be configured to identify the occupied voxels from the plurality of voxels 306A.

At 308, a hierarchical data structuring operation may be executed. In the hierarchical data structuring operation, the encoder circuitry 206 may be configured to generate a hierarchical data structure 308A of the plurality of voxels 306A (i.e. the occupied voxels) based on the geometrical information associated with the plurality of voxels 306A. In an exemplary embodiment, the generated hierarchical data structure 308A may be an Octree. In other embodiments, the hierarchical data structure 308A may be a modification of the Octree or even a k-dimensional tree, where k represents a number of dimensions. The hierarchical data structure 308A may be indicative of a 3D geometrical representation of the plurality of voxels 306A in the 3D space. The hierarchical data structure 308A may sub-divide the 3D space corresponding to the generated plurality of voxels 306A into a plurality of partitions. Each partition may correspond to a sub-division of the 3D space into a set of octants, where each sub-cube in the set of octants may correspond to an occupied or an unoccupied voxel of the plurality of voxels 306A. An occupied voxel may be a voxel that may correspond to the attribute information and the geometrical information for a set of feature points of the 3D point cloud 302A.

In accordance with an embodiment, the hierarchical data structure 308A may represent the plurality of voxels 306A in an Octree that may include a root node which may have a set of "8" child nodes. The depth of the hierarchical data structure 308A may be based on whether a further branch of a node in the hierarchical data structure 308A will be occupied by a voxel of the generated plurality of voxels 306A. Each child node may further include another set of child nodes. For example, the root node of an Octree may branch out to have "8" child nodes. The last set of nodes (at a bottom level of the tree structure) of the hierarchical data structure 308A may be referred to as a set of leaf nodes. Each of different branches of the hierarchical data structure 308A may lead to a corresponding set of leaf nodes. For example, for the Octree structure, the number of leaf nodes in the set of leaf nodes may be "8" that may represent an octant in the given 3D space. Each voxel (i.e. an occupied voxel) of the generated plurality of voxels 306A may correspond to a leaf node of hierarchical data structure 308A. Thus, some of the nodes of the hierarchical data structure 308A may represent unoccupied voxels and other nodes may represent occupied voxels of the generated plurality of voxels 306A. It should be noted that the representation of the plurality of voxels 306A in the form of the hierarchical data structure 308A may help preserve the geometrical information, such as a relative position of neighboring voxels in the 3D space.

At 310, a data serialization operation may be executed. The data serialization operation may be executed as part of a geometry coding process to encode the geometrical information associated with the 3D point cloud 302A. In the data serialization operation, the encoder circuitry 206 may be configured to generate a flat geometry code 310A that may be indicative of the geometrical information of the generated plurality of voxels 306A. The flat geometry code 310A may be generated based on the generated hierarchical data structure 308A. More specifically, the encoder circuitry 206 may be configured to map the geometrical information (such as 3D coordinate points of each of the plurality of voxels 306A) to a one-dimensional (1D) array that may correspond to the flat geometry code 310A for the hierarchical data structure 308A. The flat geometry code 310A may be generated in accordance with a scan order. The scan order may specify a traversal path to interleave binary representations of the coordinate values of each individual voxel of the generated plurality of voxels 306A.

In accordance with an embodiment, the flat geometry code 310A may be generated in accordance with a Morton order (or a Z-order). The encoder circuitry 206 may be configured to generate the flat geometry code 310A in accordance with the Morton order. In such a case, the flat geometry code 310A may be referred to as a Morton code. The Morton code for the generated plurality of voxels 306A may map multi-dimensional coordinate values into 1D while preserving locality of each of the plurality of voxels 306A in the hierarchical data structure 308A. The Morton code in the 3D space may be generated by interleaving a binary representation of the geometrical information (i.e. the 3D coordinates) of the plurality of voxels 306A. The entropy coding operations for the flat geometry code 310A is described at 320.

At 312, encoding stage operations may be executed. The encoding stage operations may include a plurality of operations from 314 to 320 that may be executed by the encoder circuitry 206. At 314, a hierarchical transform operation may be executed. In the hierarchical transform operation, the encoder circuitry 206 may be configured to generate a plurality of hierarchical transform coefficients 314A by application of a hierarchical transform scheme on the plurality of voxels 306A. The generation of the plurality of hierarchical transform coefficients 314A may be based on a weight of each of the plurality of hierarchical transform coefficients 314A. The hierarchical transform scheme may correspond to a set of operations on the attribute information corresponding to the generated plurality of voxels 306A. For example, the attribute information may include color attributes for an average luma (Y), chroma-blue difference (Cb), and chroma-red (Cr) values for a voxel.

The plurality of hierarchical transform coefficients 314A may be generated by a tree-search from leaf nodes to the root node of the hierarchical data structure 308A. The plurality of hierarchical transform coefficients 314A may include a low pass hierarchical transform coefficient and a plurality of high pass hierarchical transform coefficients. The low pass hierarchical transform coefficient may correspond to a low frequency value that may occupy the root node of the hierarchical data structure 308A and may have the highest weight value among the plurality of hierarchical transform coefficients 314A. Similarly, the plurality of high pass hierarchical transform coefficients may correspond to high frequency values with lower weight values as compared to that of the low pass hierarchical transform coefficient.

An embodiment for the application of the hierarchical transform scheme is described herein. Each voxel of the plurality of voxels 306A may be associated with an attribute value. The encoder circuitry 206 may be configured to assign a weight to each voxel of the plurality of voxels 306A. The assignment of the weight to each voxel of the plurality of voxels 306A may be a uniform assignment of a constant weight value (such as "1" or a non-uniform assignment of different weight values. The encoder circuitry 206 may be further configured to recursively select a pair of attribute values (such as color values (Y, Cb, Cr)) for a pair of neighboring voxels of the plurality of voxels 306A. The pair of neighboring voxels may occupy two leaf nodes in the hierarchical data structure 308A. For each selected pair of attribute values, the encoder circuitry 206 may be configured to apply a specific linear algebraic operation (such as a matrix multiplication) between corresponding pair of weights and selected pair of attribute values. The application of the specific linear algebraic operation may generate a pair of hierarchical transform coefficients for the selected pair of neighboring voxels. Thereafter, the encoder circuitry 206 may be configured to update the weight for each hierarchical transform coefficient ((a corresponding voxel) of the pair of hierarchical transform coefficients. The aforementioned process may be repeated at each level of the hierarchical data structure 308A till the plurality of hierarchical transform coefficients 314A are generated with corresponding plurality of weights.

In accordance with another embodiment, the encoder circuitry 206 may be configured to generate the plurality of hierarchical transform coefficients 314A by application of a regional adaptive hierarchical transform (RAHT) scheme on the plurality of voxels 306A. In such a case, the RAHT scheme may correspond to the hierarchical transform scheme. The application of RAHT scheme to generate the plurality of hierarchical transform coefficients 314A may be known to one ordinarily skilled in the art. Thus, the details of the application of the RAHT scheme is omitted from the disclosure for the sake of brevity.

At 316, a quantization operation may be executed. The quantization operation may include a sequence of operations to be executed by the encoder circuitry 206. In one operation of the sequence of operations, the encoder circuitry 206 may be configured to classify the plurality of hierarchical transform coefficients 314A into a plurality of sub-bands of hierarchical transform coefficients. The classification of the plurality of hierarchical transform coefficients 314A into the plurality of sub-bands of hierarchical transform coefficients may be based on the weight of each of the plurality of hierarchical transform coefficients 314A. Here, the weight may be an updated weight value obtained after the application of the hierarchical transform scheme on the plurality of voxels 306A.

The weight corresponding to each of the plurality of hierarchical transform coefficients 314A may be associated with a frequency of each of the plurality of hierarchical transform coefficients 314A, where the weight may have inversely proportional relationship with respect to the frequency of occurrence of hierarchical transform coefficients. In the plurality of hierarchical transform coefficients 314A, a hierarchical transform coefficient having the lowest frequency may have the highest weight. Thus, the low frequency coefficient may have the highest weight among the plurality of hierarchical transform coefficients 314A. Most of the information to represent the 3D point cloud 302A may lie with the low frequency coefficient. Further, each of the plurality of hierarchical transform coefficients 314A may be associated with a color component of a plurality of color components of a color space, such as the YCbCr space.

In accordance with an embodiment, the at least one threshold weight value may be pre-specified as a stored configuration in the memory 210. In such a case, the encoder circuitry 206 may retrieve the stored configuration from the memory 210 and classify the plurality of hierarchical transform coefficients 314A into the plurality of sub-bands of hierarchical transform coefficients based on the comparison of the pre-specified at least one threshold weight value with the weight of each of the plurality of hierarchical transform coefficients 314A.

In accordance with an alternate embodiment, the encoder circuitry 206 may be configured to estimate at least one threshold weight value associated with the plurality of hierarchical transform coefficients 314A. In such a case, the estimation of the at least one threshold weight value may be based on an optimization of a peak signal to noise ratio (PSNR) between the 3D point cloud 302A (i.e. an un-coded point cloud) and a reconstructed cloud, with a selection (e.g., iterative selection) of different values for at least one threshold weight value. The encoder circuitry 206 may be further configured to compare the weight of each of the plurality of hierarchical transform coefficients 314A with the at least one threshold weight value. The plurality of hierarchical transform coefficients 314A may be classified into the plurality of sub-bands of hierarchical transform coefficients based on the comparison of the weight of each of the plurality of hierarchical transform coefficients 314A with the estimated at least one threshold weight value.

For example, a range of weight values for the generated plurality of hierarchical transform coefficients 314A may span from "1" to "20". Here, "1" may be the weight for hierarchical transform coefficients that correspond to the leaf nodes (or maximum depth) of the hierarchical data structure 308A and "20" may be the weight for the hierarchical transform coefficient that corresponds to the root node of the hierarchical data structure 308A. The encoder circuitry 206 may be configured to select "5" and "15" as two threshold weight values. All the hierarchical transform coefficients that are less "5" and greater than "1" may be classified into a first sub-band (S1). All the hierarchical transform coefficients that are greater than or equal to "5" and less than "15" may be classified into a second sub-band (S2). Similarly, all the hierarchical transform coefficients that are greater than or equal to "15" may be classified into a third sub-band (S3). The hierarchical transform coefficients in each of S1, S2, and S3 may have coefficient values in a different range. This classification may help the encoder circuitry 206 to selectively quantize each of S1, S2, and S3 based on achievable compression targets, such as a desired average bits per sample in an encoded 3D point cloud 322 and/or color channel suppression targets.

In another operation of the sequence of operations, the encoder circuitry 206 may be configured to generate a plurality of quantized levels 316A by application of a different quantization scheme of a set of different quantization schemes on each sub-band of hierarchical transform coefficients of the plurality of sub-bands of hierarchical transform coefficients. In some embodiments, the encoder circuitry 206 may be configured to select the different quantization scheme from the set of different quantization schemes for each sub-band of hierarchical transform coefficients of the plurality of sub-bands of hierarchical transform coefficients. Each of the set of different quantization schemes may correspond to a set of parameters for the quantization of a corresponding sub-band of hierarchical transform coefficients of the plurality of sub-bands of hierarchical transform coefficients. At least one or more parameters of the set of parameters may be different for each of the set of different quantization schemes. Examples of the set of parameters may include, but are not limited to, a size of a sub-band specific dead zone, a number of sub-band specific dead zones per sub-band, a size/number of sub-band specific dead zones per color component, a step size, and a specific relationship between a quantization level from a corresponding hierarchical transform coefficient.

In accordance with an embodiment, the different quantization scheme for each of one or more sub-bands of hierarchical transform coefficients of the plurality of sub-bands of hierarchical transform coefficients may correspond to a sub-band specific dead zone for the one or more sub-bands of hierarchical transform coefficients. Alternatively stated, the different quantization scheme may specify a size of a sub-band specific dead zone and a number of sub-band specific dead zones (e.g., a number/size of sub-band specific dead zones per color component, i.e. per Y, Cb, Cr) for each of the one or more sub-bands of hierarchical transform coefficients. The sub-band specific dead zone may correspond to a range of hierarchical transform coefficient values in which a quantized level of the plurality of quantized levels 316A for a corresponding hierarchical transform coefficient is zero. Alternatively stated, the encoder circuitry 206 may be configured to assign a zero value to the quantized level for the corresponding hierarchical transform coefficient of the plurality of hierarchical transform coefficients 314A when the corresponding hierarchical transform coefficient lies in the sub-band specific dead zone. An example of a sub-band specific dead zone is described in FIGS. 4A, and 4B.

In accordance with an embodiment, the encoder circuitry 206 may be configured to assign a sub-band specific dead zone for the one or more sub-bands of hierarchical transform coefficients of the plurality of sub-bands of hierarchical transform coefficients. The sub-band specific dead zone may be assigned to the different quantization scheme of the set of different quantization schemes. In some embodiments, the sub-band specific dead zone may be assigned based on at least one threshold weight value associated with the plurality of hierarchical transform coefficients 314A. For example, a number of threshold weight values may determine a number of sub-bands of hierarchical transform coefficients. If the number of threshold weight values is "1", the number of sub-bands may be "2". In such a case, a first sub-band may be assigned "3" sub-band specific dead zones for each of the three color components (YCbCr) and a second sub-band may not be assigned a sub-band specific dead zone. In case of the assignment of the sub-band specific dead zone, the application of the different quantization scheme of the set of different quantization schemes may be further based on the assigned sub-band specific dead zone for the one or more sub-bands of hierarchical transform coefficients of the plurality of sub-bands of hierarchical transform coefficients.

In accordance with an embodiment, each of the plurality of hierarchical transform coefficients 314A may be associated with a color component of a plurality of color components of a color space, such as YCbCr space. The encoder circuitry 206 may be further configured to assign the sub-band specific dead zone based on the color component associated with the corresponding hierarchical transform coefficient of the plurality of sub-bands of hierarchical transform coefficients. For example, for each sub-band of hierarchical transform coefficients, a set of three dead-zones may be assigned for three color components, i.e. Y, Cb, and Cr, respectively. The dead-zones for Cb and Cr channels (or components) may be specified to be larger than that for Luma (Y) channel.

In conventional methods, all the hierarchical transform coefficients that have a weight of "1" (i.e. hierarchical transform coefficients that belong to the bottom level of the hierarchical data structure 308A) may be set to "0". In contrast, the disclosed method provides a different quantization scheme for each sub-band of hierarchical transform coefficients. The different quantization scheme may specify rules to not kill all the hierarchical transform coefficients of the bottom level (i.e. weight of "1"), but instead specify an increased size of sub-band specific dead-zone. Additionally, instead of setting sub-band specific dead zones for only that sub-band of hierarchical transform coefficients which includes hierarchical transform coefficients for the bottom level (i.e. weight of "1") of hierarchical data structure 308A, the disclosed method sets a different quantization scheme (with respective sub-band specific dead zones) for other high frequency hierarchical transform coefficients in other sub-bands of hierarchical transform coefficients. In some embodiments, other parameters, such as the step size or the number of sub-band specific dead zones may be specified in the different quantization scheme. The application of the disclosed method may enable efficient suppression of hierarchical transform coefficients associated with one or more attributes, such as chroma or luma color channels. More specifically, the efficiency in suppression of hierarchical transform coefficients may result from bit-savings at the entropy coding stage and lowering of PSNR (in dB) at encoding and decoding stages. Also, this suppression may result in a reduction in a bit-depth (bits per sample) required for each quantized level of the plurality of quantization levels. Also, in some cases, an increase in the size of the sub-band specific dead zone may lead to a decrease in the number of quantization levels for the corresponding sub-band of the hierarchical transform coefficients. Such a decrease in the number of quantization levels may also help to achieve a desired compression for the 3D point cloud 302A.

At 318, a sorting operation may be executed. In the sorting operation, the encoder circuitry 206 may be configured to sort the plurality of quantized levels 316A based on the weight for each of the plurality of hierarchical transform coefficients 314A. Each of the plurality of hierarchical transform coefficients 314A may be associated with a corresponding quantized level of the plurality of quantized levels 316A. In accordance with an embodiment, the plurality of quantized levels may be sorted in an ascending order of weight of each of the plurality of hierarchical transform coefficients 314A. For example, for "8" hierarchical transform coefficients (i.e. c1, c2, c3, c4, c5, c6, c7, c8), the corresponding weights may be 1, 4, 5, 6, 2, 7, 22, 3 and the corresponding quantized levels may be q1, q2, q3, q4, q5, q6, q7, and q8. Based on the corresponding weights, the corresponding quantized levels may be sorted as q1, q5, q8, q2, q3, q4, q6, and q7. In accordance with an embodiment, the plurality of quantized levels 316A may be sorted in a descending order of weight of each of the plurality of hierarchical transform coefficients 314A. For example, for "8" hierarchical transform coefficients (i.e. c1, c2, c3, c4, c5, c6, c7, c8), the corresponding weights may be 1, 4, 5, 6, 2, 7, 22, 3 and the corresponding quantized levels may be q1, q2, q3, q4, q5, q6, q7, and q8. Based on the corresponding weights, the corresponding quantized levels may be sorted as q7, q6, q4, q3, q2, q8, q6, q1.

At 320, an entropy coding operation may be executed. In the entropy coding operation, the entropy of symbols in the flat geometry code 310A and/or the plurality of quantized levels 316A may be utilized to code the flat geometry code 310A and/or the plurality of quantized levels 316A. The entropy coding operation may be separately applied for the encoding of the flat geometry code 310A (i.e. a geometry encoding process) and the plurality of quantized levels 316A (i.e. an attribute encoding process).

In the entropy coding operation, the encoder circuitry 206 may be configured to generate a bit-stream of coded voxel geometry 322B by application of an entropy encoding scheme on the flat geometry code 310A. Similarly, the encoder circuitry 206 may be configured to encode the generated plurality of quantized levels 316A. The plurality of quantized levels 316A may be encoded (i.e. entropy coded) to generate a bit-stream of coded voxel attributes 322A. In accordance with an embodiment, the encoder circuitry 206 may be configured to generate the bit-stream of coded voxel attributes 322A by encoding a sorted plurality of quantized levels 318A. Examples of the entropy coding scheme may include, but are not limited to, a Huffman coding scheme, an exponential Golomb coding scheme, a progressive Golomb coding scheme, a Golomb-Rice coding scheme, and a combination of the Huffman coding scheme and the exponential Golomb coding scheme. The process of entropy coding may be known to one ordinarily skilled in the art. Thus, the details have been omitted from the disclosure for the sake of brevity.

In accordance with an embodiment, the encoder circuitry 206 may be further configured to transmit the generated bit-stream of coded voxel attributes 322A to at least one external device of the plurality of external devices 108A . . . 108N or the decoder circuitry 208. Also, the encoder circuitry 206 may be configured to transmit the generated bit-stream of coded voxel geometry 322B to the decoder circuitry 208 and/or the at least one external device of the plurality of external devices 108A . . . 108N. In some cases, the encoder circuitry 206 may be further configured to signal supplemental information to the decoder circuitry 208 and/or the at least one external device of the plurality of external devices 108A . . . 108N. The supplemental information may include, but is not limited to, threshold weight values that may be used for classification of the plurality of hierarchical transform coefficients 314A (i.e. which defines the sub-bands), number of sub-band specific dead zones per sub-band, indices (I(b)) of the flat geometry code 310A of lead voxels at binary level (b), weights (W(b)) of cells at binary level (b), and Boolean flags (F(b)) to indicate left siblings at binary level (b).

In accordance with an embodiment, the decoder circuitry 208 may be configured to receive the bit-stream of coded voxel attributes 322A and/or the bit-stream of coded voxel geometry 322B. The decoder circuitry 208 may be further configured to decode the received bit-stream of coded voxel attributes 322A and/or the bit-stream of coded voxel geometry 322B. The decoder circuitry 208 may be further configured to reconstruct one or more objects and/or a lossy form of the 3D point cloud 302A from the decoded bit-stream of coded voxel attributes 322A and/or the decoded bit-stream of coded voxel geometry 322B.

It should be noted that the generation of the bit-stream of coded voxel attributes 322A and the bit-stream of the coded voxel geometry 322B may result in the compression of 3D point cloud 302A. The disclosed approach for adaptively coding the 3D point cloud 302A based on the classification of the plurality of hierarchical transform coefficients 314A into different sub-bands of hierarchical transform coefficients and further on the basis of weights of each of the plurality of hierarchical transform coefficients 314A may help to apply a different quantization scheme on individual sub-bands of hierarchical transform coefficients. Also, the application of the different quantization scheme on individual sub-bands of hierarchical transform coefficients may help to selectively suppress hierarchical transform coefficients from each individual sub-band. Also, in some cases, an adaptive allocation of a sub-band specific dead zone for one or more sub-bands of hierarchical transform coefficients may further help to suppress (or reduce) a number of hierarchical transform coefficients for the quantization operation. This may help to save more bits at the entropy coding stage, without much loss in the visual quality of a reconstructed 3D point cloud and/or the 3D reconstructed models of one or more objects. An example of the performance of the disclosure method for color attributes in provided in FIGS. 6A, 6B, and 6C. The disclosed method is suitable for compression of both static 3D point clouds and dynamic 3D point clouds. For dynamic 3D point clouds, the disclosed method is suited as it employs low latency computational methods that save time, processing power, memory storage for compression of dynamic 3D point cloud 302A as well as a reduced bandwidth utilization for the transmission of the encoded 3D point cloud 322 (as multimedia content) to the decoder circuitry 208 and/or at least one of the plurality of external devices 108A . . . 108N.

Figure 4:
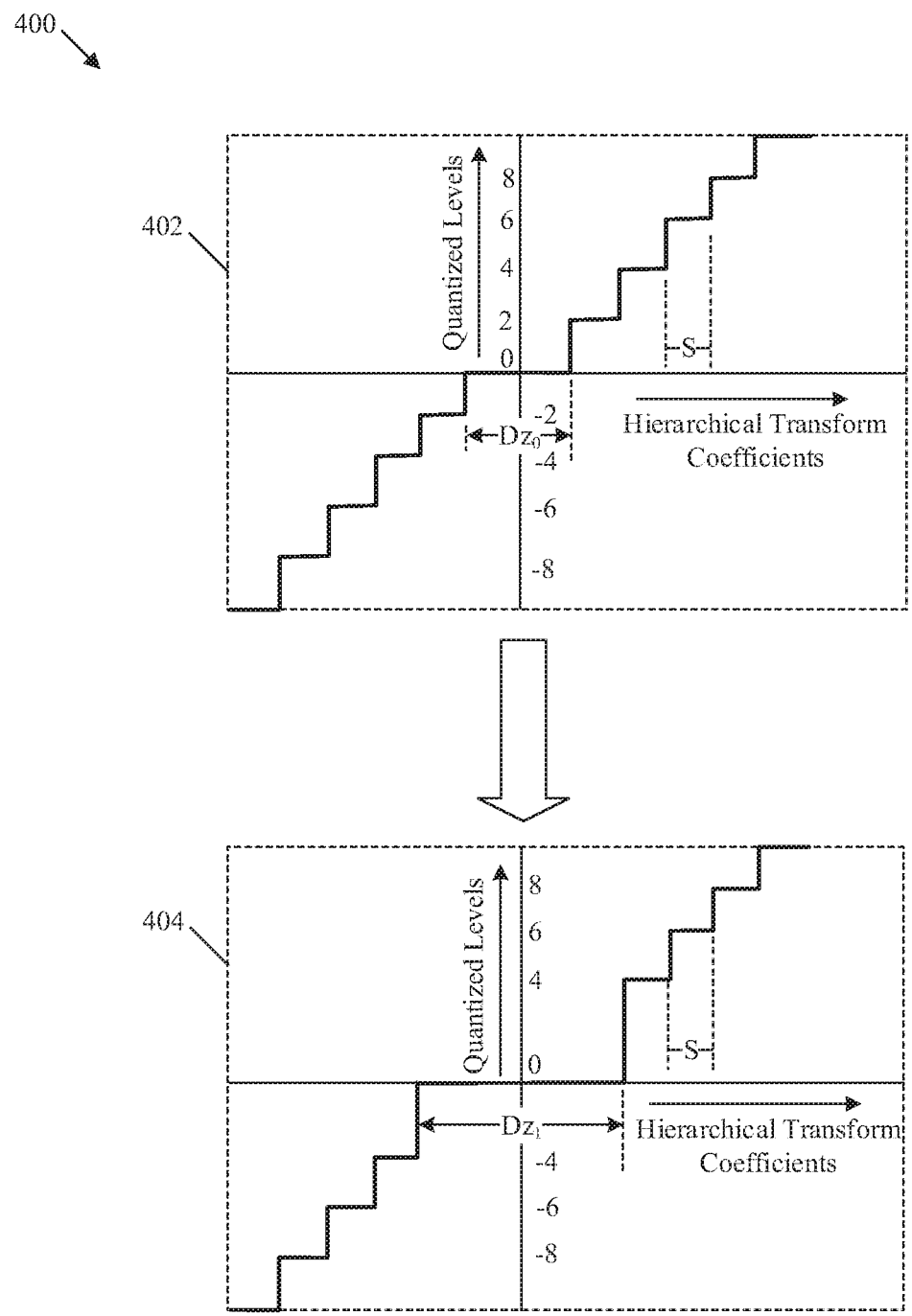
FIG. 4 illustrates an example of assignment of a sub-band specific dead zone to a sub-band of hierarchical transform coefficients through a sequence of quantization plots between hierarchical transform coefficients and corresponding quantized levels, in accordance with an embodiment of the disclosure.

FIG. 4 illustrates an example of assignment of a sub-band specific dead zone to a sub-band of hierarchical transform coefficients through a sequence of quantization plots between hierarchical transform coefficients and corresponding quantized levels, in accordance with an embodiment of the disclosure. FIG. 4 is explained in conjunction with elements from FIGS. 1, 2, 3A, and 3B. With reference to FIG. 4, there is shown a sequence of quantization plots 400 between hierarchical transform coefficients and corresponding quantized levels. The sequence of quantization plots 400 may include a first quantization plot 402 and a second quantization plot 404.

The first quantization plot 402 may correspond to a default quantization scheme, which may be pre-set as a default configuration on the encoder circuitry 206 in case sub-band specific dead zone remains unassigned for one or more sub-bands of hierarchical transform coefficients. In the first quantization plot 402, a typical variation of quantization levels (represented by steps) is shown for a given input of hierarchical transform coefficients (represented along horizontal axis). Shown as an example, the quantization levels vary from "−8" to "+8" with a default step size of "5". Also, a default dead zone ($Dz_0$) may be pre-set for the default quantization scheme. The encoder circuitry 206 may be configured to apply a different quantization scheme to a corresponding sub-band of hierarchical transform coefficients by assigning a sub-band specific dead zone ($Dz_1$).

The different quantization schemes may correspond to a set of parameters for the quantization of the corresponding sub-band of hierarchical transform coefficients of Examples of the set of parameters may include, but are not limited to, a size of a sub-band specific dead zone, a number of sub-band specific dead zones per sub-band, a size/number of sub-band specific dead zones per color component, a step size, and a specific relationship between a quantization level from a corresponding hierarchical transform coefficient. The details of the different quantization schemes is described, for example in FIGS. 3A and 3B.

The sub-band specific dead zone ($Dz_1$) is shown as an example in the second quantization plot 404. By default, the step size (S) may remain the same for the different quantization scheme. However, in some embodiments, the step size (S) may also change for the different quantization scheme. Also, in some embodiments, the encoder circuitry 206 may be configured to set a size of the sub-band specific dead zone and/or a number of sub-band specific dead zone per sub-band for each color channel of the color space.

Figure 5:
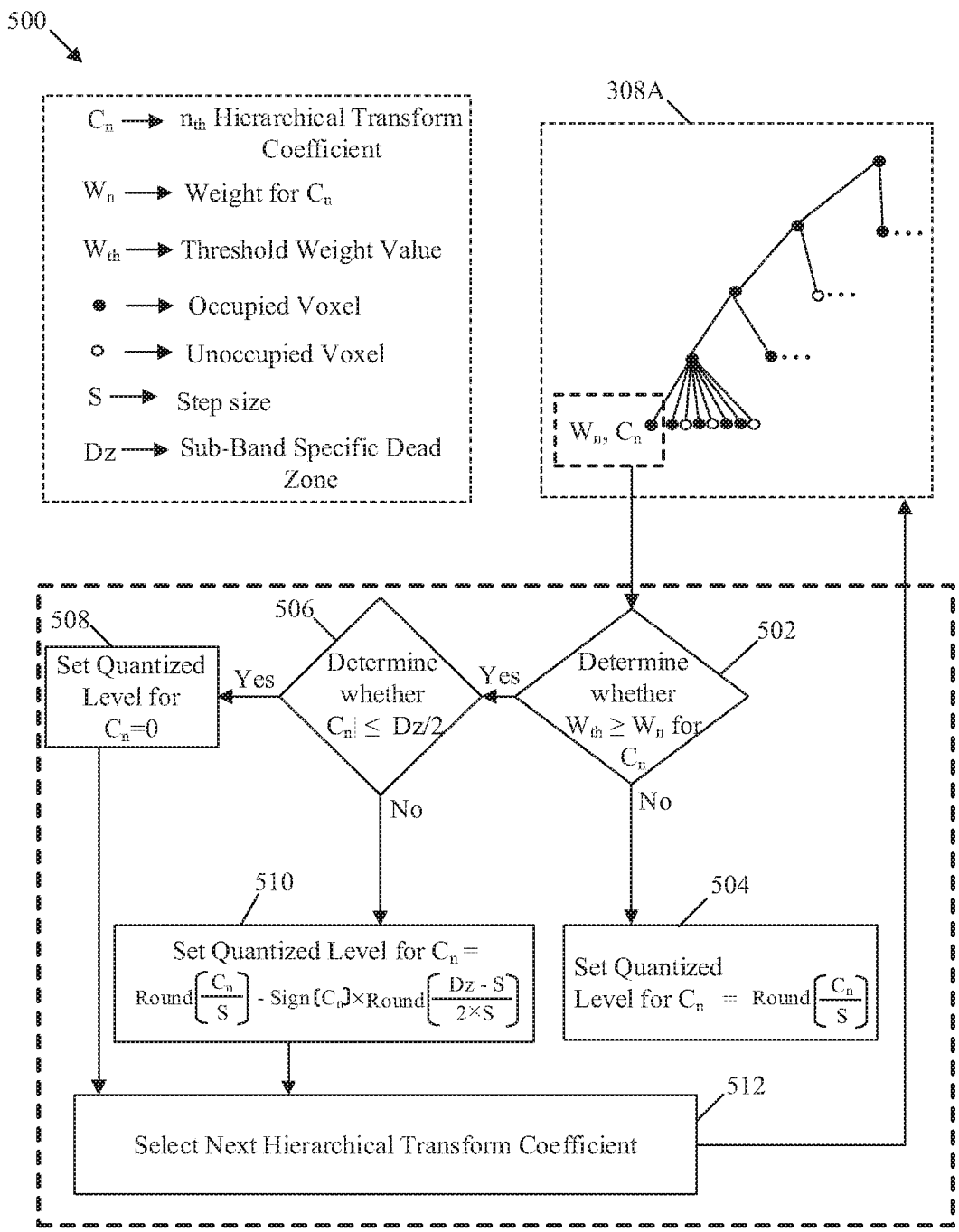
FIG. 5 illustrates an exemplary decision flowchart for sub-band adaptive quantization of a 3D point cloud, in accordance with an embodiment of the disclosure.

FIG. 5 illustrates an exemplary decision flowchart for sub-band adaptive quantization of a 3D point cloud, in accordance with an embodiment of the disclosure. FIG. 5 is explained in conjunction with elements from FIGS. 1, 2, 3A, 3B, and 4. With reference to FIG. 5, there is shown a decision flowchart 500 that depicts exemplary operations for sub-band adaptive quantization of the plurality of hierarchical transform coefficients. The exemplary operations are described for a single hierarchical transform coefficient along a search path on an Octree of hierarchical transform coefficients. Each node on the Octree may be associated with a corresponding hierarchical transform coefficient of a plurality of hierarchical transform coefficients (represented by $C_1$ to $C_n$). Here, $C_1$ may represent the hierarchical transform coefficient at the root node and $C_n$ may correspond to a bottom level (or a leaf node) of the Octree. The plurality of hierarchical transform coefficients ($C_1$ to $C_n$) may be associated with a plurality of voxels that may be generated from the 3D point cloud. Each of the plurality of hierarchical transform coefficients ($C_1$ to $C_n$) may be associated with a corresponding weight value of the plurality of weight values (represented by $W_1$ to $W_n$). The encoder circuitry 206 may be configured to quantize each of the plurality of hierarchical transform coefficients ($C_1$ to $C_n$) by a search (i.e. a tree traversal), for example, from left to right and bottom to top level of the Octree. The exemplary operations for classification and quantization of an nth hierarchical transform coefficient is described herein from 502 to 512.

At 502, the encoder circuitry 206 may be configured to compare the weight value ($W_n$) associated with the hierarchical transform coefficient ($C_n$) with a threshold weight value ($W_{th}$). $W_{th}$ may be the threshold weight value (described in FIGS. 3A and 3B) that may be either preset on the encoder circuitry 206 or may be estimated by the encoder circuitry 206. The encoder circuitry 206 may be configured to classify the hierarchical transform coefficient ($C_n$) into a low frequency sub-band ($LF_{Sub-Band}$) or a high frequency sub-band ($HF_{Sub-Band}$) based on the comparison of the hierarchical transform coefficient ($C_n$) with the threshold weight value ($W_{th}$). The low frequency sub-band ($LF_{Sub-Band}$) may correspond to grayscale feature points in the 3D point cloud, i.e. feature points that may have small negative or positive (near zero) coefficient values. Similarly, the high frequency sub-band ($HF_{Sub-Band}$) may correspond to dark and bright feature points in the 3D point cloud, i.e. feature points that may have large negative and large positive coefficient values.

The encoder circuitry 206 may be configured to determine whether the threshold weight value ($W_{th}$) is greater than or equal to the weight value ($W_n$) for the hierarchical transform coefficient ($C_n$). In case the threshold value $W_{th}$ is greater than or equal to the weight value ($W_n$) for the hierarchical transform coefficient ($C_n$), control passes to 506. Also, in such a case, the hierarchical transform coefficient ($C_n$) may classified into the low frequency sub-band ($LF_{Sub-Band}$). Otherwise, the control passes to 504 and the hierarchical transform coefficient ($C_n$) may be classified into the high frequency sub-band ($HF_{Sub-Band}$).

The encoder circuitry 206 may be further configured to select, from the set of quantization schemes, a different quantization scheme for each of the low frequency sub-band ($LF_{Sub-Band}$) and the high frequency sub-band ($HF_{Sub-Band}$). The different quantization scheme may define a specific relationship between a quantization level and a corresponding hierarchical transform coefficient. Also, the different quantization scheme may specify a size/number of a sub-band specific dead zone for each of the low frequency sub-band ($LF_{Sub-Band}$) and the high frequency sub-band ($HF_{Sub-Band}$). For example, the different quantization scheme for the low frequency sub-band ($LF_{Sub-Band}$) may have a sub-band specific dead zone (Dz) while the different quantization scheme for the high frequency sub-band ($HF_{Sub-Band}$) may lack the sub-band specific dead zone (Dz).

At 504, the encoder circuitry 206 may be configured to set a quantized level ($Q_n$) for the hierarchical transform coefficient ($C_n$) using the specific relationship (1), as follows:

$$Q_n = \text{Round}\left(\frac{C_n}{S}\right) \quad (1)$$

where,
$Q_n$ is the nth quantization level for the hierarchical transform coefficient ($C_n$),
S is the step size for quantization, and
Round(.) is a function that may round up the ratio of $C_n$ by S.

At 506, the encoder circuitry 206 may be configured to determine whether an absolute value of the hierarchical transform coefficient ($C_n$) is less than or equal to half the size of the sub-band specific dead zone (Dz), i.e. if $$|C_n| \leq \frac{D_z}{2},$$

where |.| represents absolute value function. In case the absolute value of the hierarchical transform coefficient ($C_n$) is less than or equal to half the size of the sub-band specific dead zone (Dz), control passes to 508. Otherwise, control passes to 510.

At 508, the encoder circuitry 206 may be configured to set the quantized level for the hierarchical transform coefficient ($C_n$) to zero (0) in case $$|C_n| \leq \frac{D_z}{2}.$$

At 510, the encoder circuitry 206 may be configured to set the quantized level ($Q_n$) for the hierarchical transform coefficient ($C_n$) using the specific relationship (2), as follows:

$$Q_n = \text{Round}\left(\frac{C_n}{S}\right) - \text{Sign}(C_n) \times \left(\frac{D_z - S}{2 \times S}\right) \quad (2)$$

where, Sign(.) function represents Signum function. Control further passes to 512.

At 512, the encoder circuitry 206 may be further configured to select a next hierarchical transform coefficient ($C_{n-1}$) from the plurality of hierarchical transform coefficients ($C_1$ to $C_n$) for classification into the low frequency sub-band ($LF_{Sub-Band}$) or the high frequency sub-band ($HF_{Sub-Band}$) by following method from 502 to 510. The operations of the decision flowchart 500 from 502 to 512 may be repeatedly executed by the encoder circuitry 206 for each hierarchical transform coefficient of the plurality of hierarchical transform coefficients ($C_1$ to $C_n$) till the plurality of quantization levels are obtained.

Figure 6:
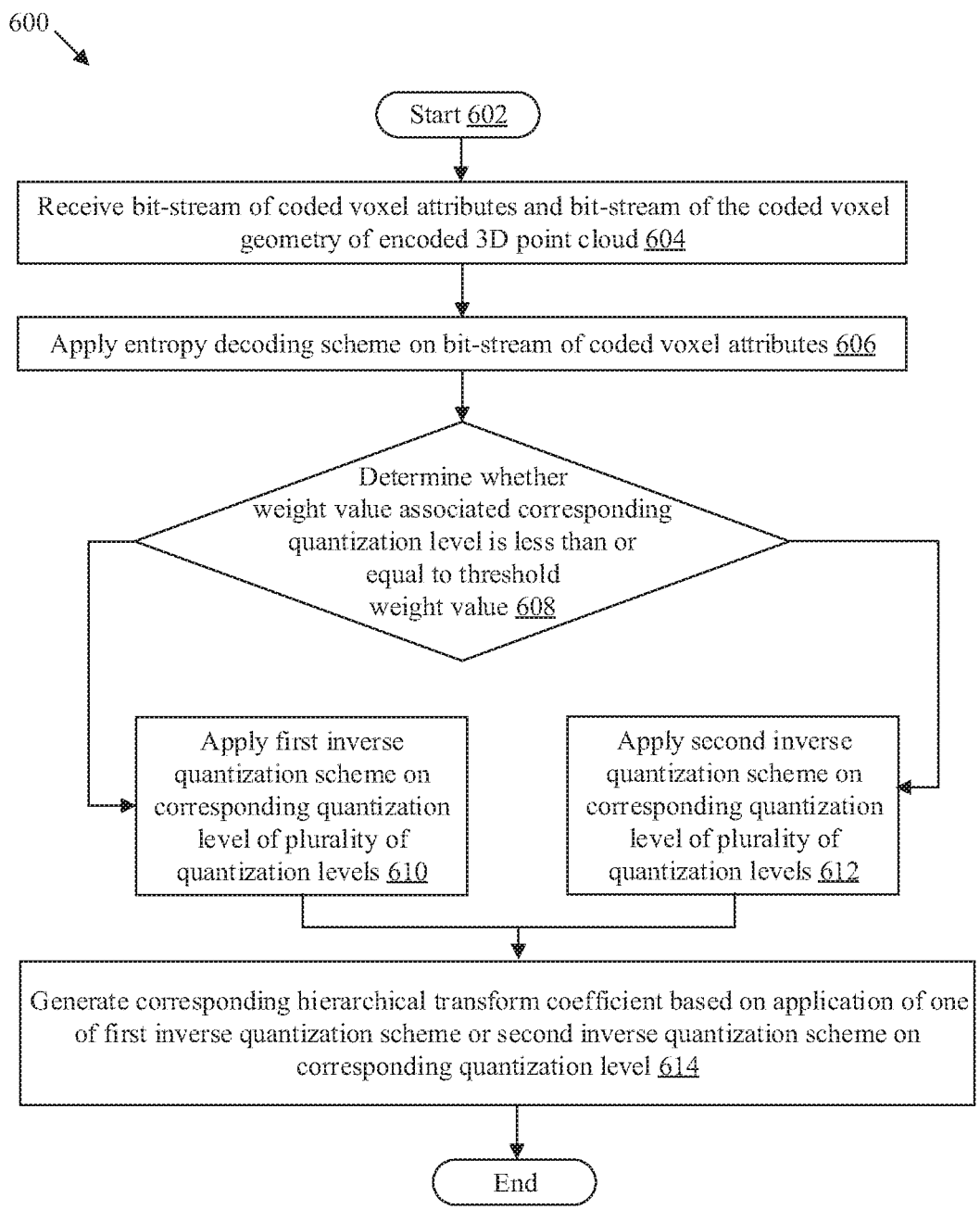
FIG. 6 illustrates an exemplary flowchart for sub-band adaptive inverse quantization of a 3D point cloud, in accordance with an embodiment of the disclosure.

FIG. 6 illustrates an exemplary flowchart for sub-band adaptive inverse quantization of a 3D point cloud, in accordance with an embodiment of the disclosure. FIG. 6 is explained in conjunction with elements from FIGS. 1, 2, 3A, 3B, 4, and 5. With reference to FIG. 6, there is shown a flowchart 600 that depicts exemplary operations for sub-band adaptive quantization of the plurality of hierarchical transform coefficients. The exemplary operations may start from 602 and proceed to 604.

At 604, a bit-stream of coded voxel attributes and a bit-stream of the coded voxel geometry of an encoded 3D point cloud may be received. The decoder circuitry 208 may be configured to receive the bit-stream of coded voxel attributes and the bit-stream of the coded voxel geometry of the encoded 3D point cloud. Also, the decoder circuitry 208 may be configured to receive supplementary information that may include weight information, dead-zone related information, and step size information for a plurality of hierarchical transform coefficients ($C_1, C_2 \ldots C_n$) which are encoded in the bit-stream of coded voxel attributes.

At 606, an entropy decoding scheme may be applied on the bit-stream of coded voxel attributes. The decoder circuitry 208 may apply the entropy decoding scheme on the bit-stream of coded voxel attributes. Examples of the entropy decoding scheme may include, but are not limited to, Huffman decoding, arithmetic decoding, and run-length Golomb-Rice decoding. By application of the entropy decoding scheme, the decoder circuitry 208 may be configured to generate a plurality of quantization levels ($Q_1, Q_2 \ldots Q_n$) that correspond to a plurality of hierarchical transform coefficients ($C_1, C_2 \ldots C_n$) of the 3D point cloud. The plurality of hierarchical transform coefficients ($C_1, C_2 \ldots C_n$) may be classified into the low frequency sub-band ($LF_{Sub-Band}$) and the high frequency sub-band ($HF_{Sub-Band}$).

At 608, it may be determined whether the weight value ($W_n$) associated a corresponding quantization level ($C_n$) is less than or equal to a threshold weight value ($W_{th}$). The decoder circuitry 208 may be configured to determine whether the weight value ($W_n$) associated the corresponding quantization level ($C_n$) is less than or equal to the threshold weight value ($W_{th}$). In case the weight value ($W_n$) associated the corresponding quantization level ($C_n$) is less than or equal to the threshold weight value ($W_{th}$), control passes to 610. Otherwise, control passes to 612.

At 610, a first inverse quantization scheme may be applied on the corresponding quantization level ($Q_n$) of the plurality of quantization levels ($Q_1, Q_2 \ldots Q_n$). The decoder circuitry 208 may be configured to apply the first inverse quantization scheme on the corresponding quantization level ($Q_n$) of the plurality of quantization levels ($Q_1, Q_2 \ldots Q_n$). As an example, in the first inverse quantization scheme, if the quantization level (Qn) is equal to zero ("0"), the decoder circuitry 208 may be configured to set a value of a corresponding hierarchical transform coefficient ($C_n$) to be equal to zero ("0"). Otherwise, the decoder circuitry 208 may be configured to set the value of the corresponding hierarchical transform coefficient ($C_n$) based on a specific relationship (3), as follows:

$$C_n = \left(Q_n + \text{Sign}(Q_n) \times \text{Round}\left(\frac{Dz - S}{2 \times S}\right)\right) \times S \quad (3)$$

where,
Sign(.) function represents Signum function,
Round(.) function may convert a floating point value to a nearest integer value,
Dz represents a sub-band specific dead zone that is used by the encoder circuitry 206 for the quantization of the plurality of hierarchical transform coefficients ($C_1, C_2 \ldots C_n$), and
S represents a step size that is used by the encoder circuitry 206 for the quantization of the plurality of hierarchical transform coefficients ($C_1, C_2 \ldots C_n$).

At 612, a second inverse quantization scheme may be applied on the corresponding quantization level ($Q_n$) of the plurality of quantization levels ($Q_1, Q_2 \ldots Q_n$). The decoder circuitry 208 may be configured to apply the second inverse quantization scheme on the corresponding quantization level ($Q_n$) of the plurality of quantization levels ($Q_1, Q_2 \ldots Q_n$). As an example, in the second inverse quantization scheme, the decoder circuitry 208 may be configured to set the value of the corresponding hierarchical transform coefficient ($C_n$) based on a specific relationship (4), as follows:

$$C_n = Q_n \times S \quad (4)$$

where,
S represents a step size that is used by the encoder circuitry 206 for the quantization of the plurality of hierarchical transform coefficients ($C_1, C_2 \ldots C_n$).

At 614, a corresponding hierarchical transform coefficient ($C_n$) may be generated based on the application of one of the first inverse quantization scheme or the second inverse quantization scheme on the corresponding quantization level ($Q_n$). The decoder circuitry 208 may be configured to generate the corresponding hierarchical transform coefficient ($C_n$) based on the application of one of the first inverse quantization scheme or the second inverse quantization scheme on the corresponding quantization level ($Q_n$). Control further passes to end.

Figure 7A:
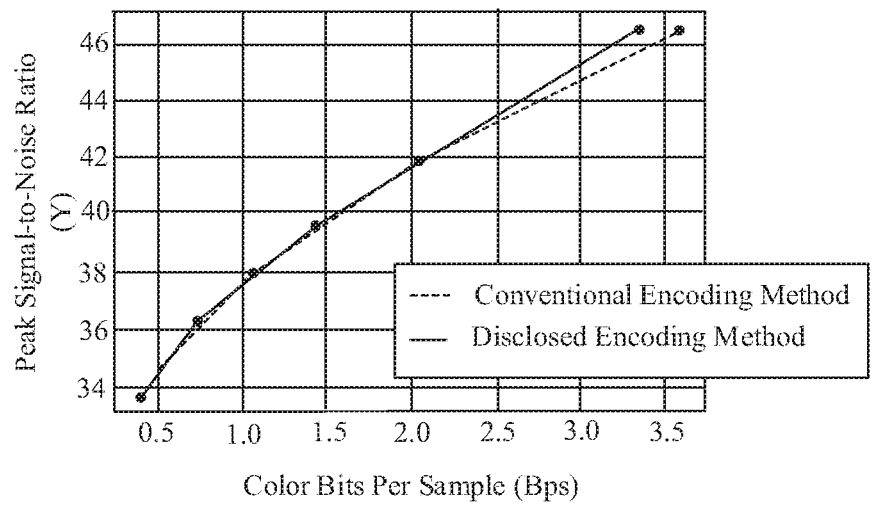
FIGS. 7A, 7B, and 7C, collectively, illustrate a set of graphs that indicate relative performance of the electronic apparatus of FIG. 2, in accordance with an embodiment of the disclosure.
Figure 7B:
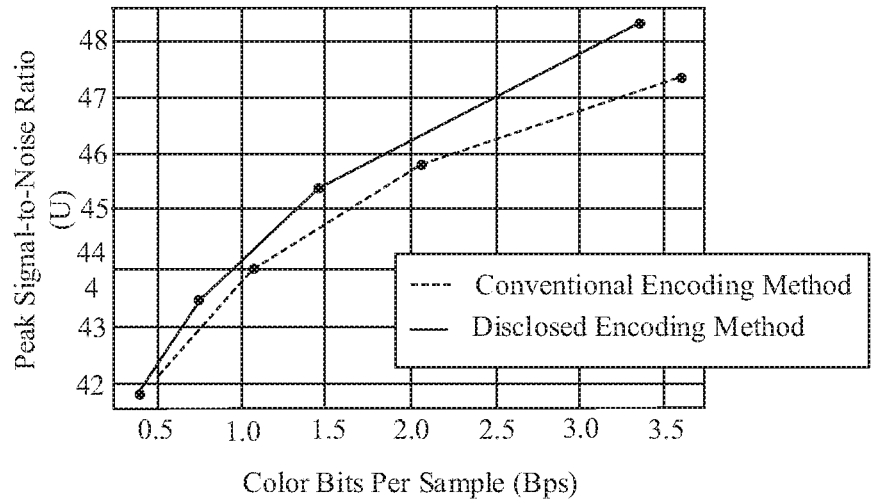
Figure 7C:
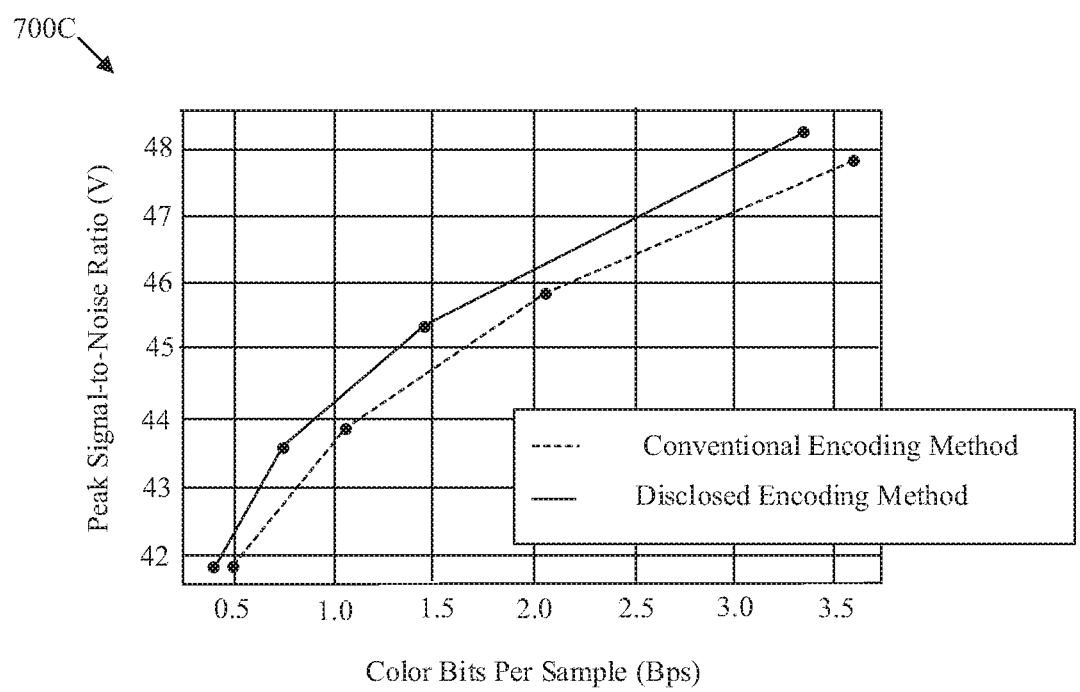

FIGS. 7A, 7B, and 7C, collectively, illustrate a set of graphs that indicate relative performance of the electronic apparatus of FIG. 2, in accordance with an embodiment of the disclosure. FIGS. 7A, 7B, and 7C are explained in conjunction with elements from FIGS. 1, 2, 3A, 3B, 4, 5, and 6. With reference to FIGS. 7A, 7B, and 7C, there is shown a first graph 700A, a second graph 700B, and a third graph 700C. The first graph 700A indicates peak signal-to-noise ratio (PSNR) performance of the disclosed encoding method (as described in FIGS. 1, 3A, and 3B) for a range of bit-depth values for a luma (Y) color channel. Similarly, the second graph 700B indicates PSNR performance of the disclosed encoding method (as described in FIGS. 1, 3A, and 3B) for a range of bit-depth values for a chroma-blue (U) color channel. Similarly, the third graph 700C indicates PSNR performance of the disclosed encoding method (as described in FIGS. 1, 3A, and 3B) for a range of bit-depth values for a chroma-red (V) color channel. The range of bit-depth values may be measured in color bits per sample (Bps). It should be noted that data provided in each of the first graph 700A, the second graph 700B, and the third graph 700C may merely be taken as experimental data that illustrates encoding efficiency and may not be construed as limiting for the disclosure.

Each of the first graph 700A, the second graph 700B, and the third graph 700C may further indicate a relative PSNR performance of the disclosed encoding method over a conventional encoding method for a 3D point cloud. From each of the first graph 700A, the second graph 700B, and the third graph 700C, it may be observed that the difference in PSNR values (in dB) increases as the bit-depth increases with the range of bit-depth values. Also, the difference is larger for two chroma color channels as compared to the luma color channel. The PSNR values for the disclosed encoding method may be larger than that for the conventional encoding method, especially when the bit-depth increases.

The coding gain as a measure of performance of the disclosed encoding method over a reference conventional encoding method, is provided in two tables, i.e. Table 1 and Table 2. Table 1 may be a reference table for the coding gain achieved by reference conventional encoding method. Similarly, Table 2 may be an experimental table for the disclosed encoding method.

TABLE 1

Coding Gain for Reference Conventional Encoding Method

| Per Input Point | Color Bit-Stream (bits) | End-to-End PSNR (dB) | | |
|---|---|---|---|---|
| | | Luma | Chroma (Cb) | Chroma (Cr) |
| 0 | 0.49147 | 34.57 | 41.69 | 42.22 |
| 0 | 1.04745 | 37.89 | 43.48 | 43.91 |
| 0 | 2.03658 | 41.88 | 45.17 | 45.62 |
| 0 | 3.57422 | 46.41 | 46.63 | 47.22 |

TABLE 2

Coding Gain for Disclosed Encoding Method

| Per Input Point (bpip) | Color Bit-Stream (bits) | End-to-End PSNR (dB) | | |
|---|---|---|---|---|
| | | Luma | Chroma (Cb) | Chroma (Cr) |
| 0 | 0.389873 | 33.66 | 41.52 | 42.18 |
| 0 | 0.744833 | 36.24 | 43.02 | 43.67 |
| 0 | 1.43612 | 39.58 | 44.82 | 45.19 |
| 0 | 3.3352 | 46.42 | 47.51 | 47.56 |

From Table 1 and Table 2, it may be observed that the value of color bit-stream of an encoded 3D point cloud is less for the disclosed encoding method as compared to that for the reference conventional encoding method. Also, the end-to-end PSNR for each of the color channels shows improvement over reference conventional encoding method. It should be noted that data provided in the Table 1 and Table 2 may merely be taken as experimental data that illustrates encoding efficiency and may not be construed as limiting the disclosure.

Figure 8A:
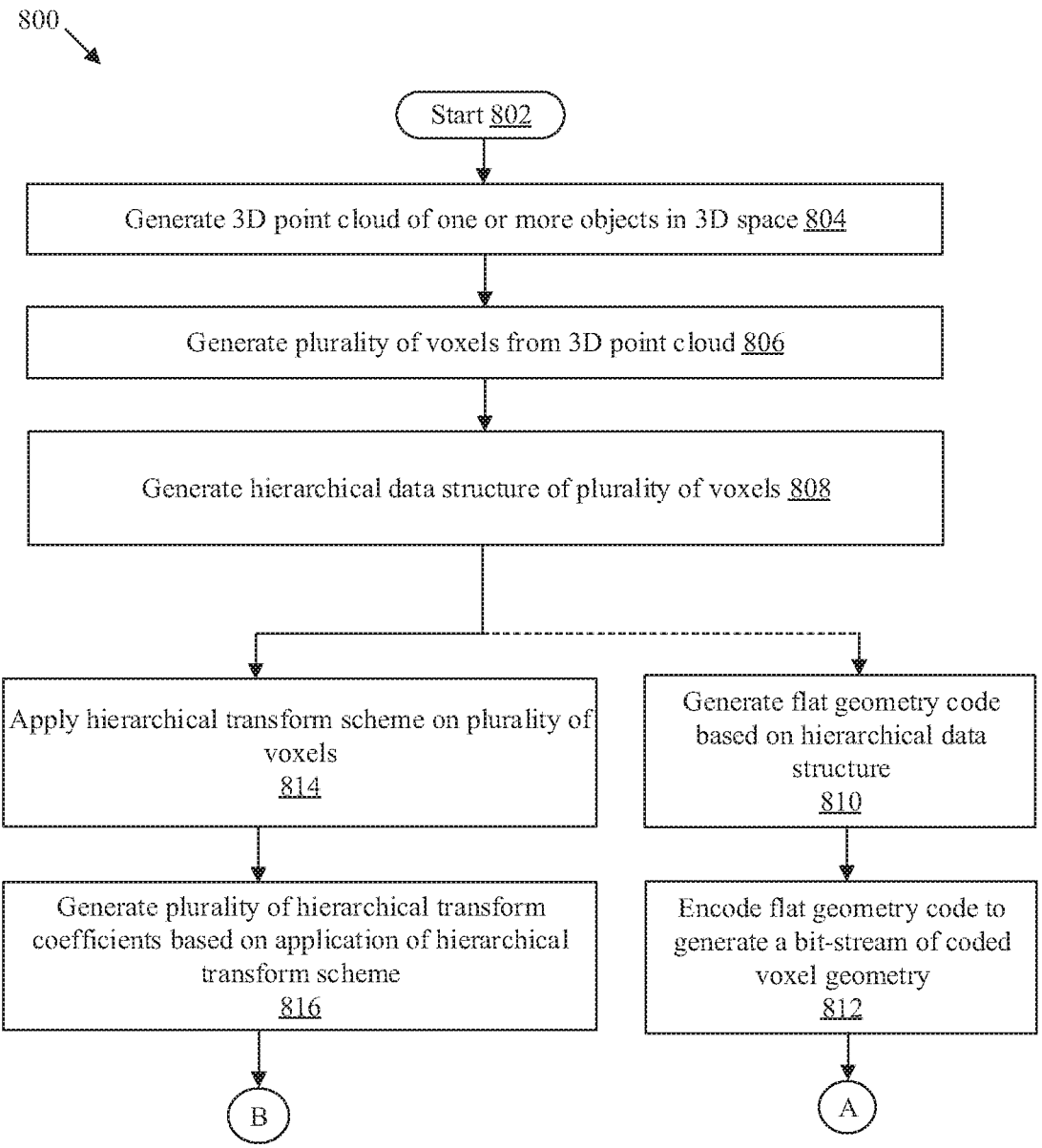
FIGS. 8A and 8B, collectively, depict a flowchart that illustrates exemplary operations for adaptive sub-band based coding of hierarchical transform coefficients of 3D point cloud, in accordance with an embodiment of the disclosure.
Figure 8B:
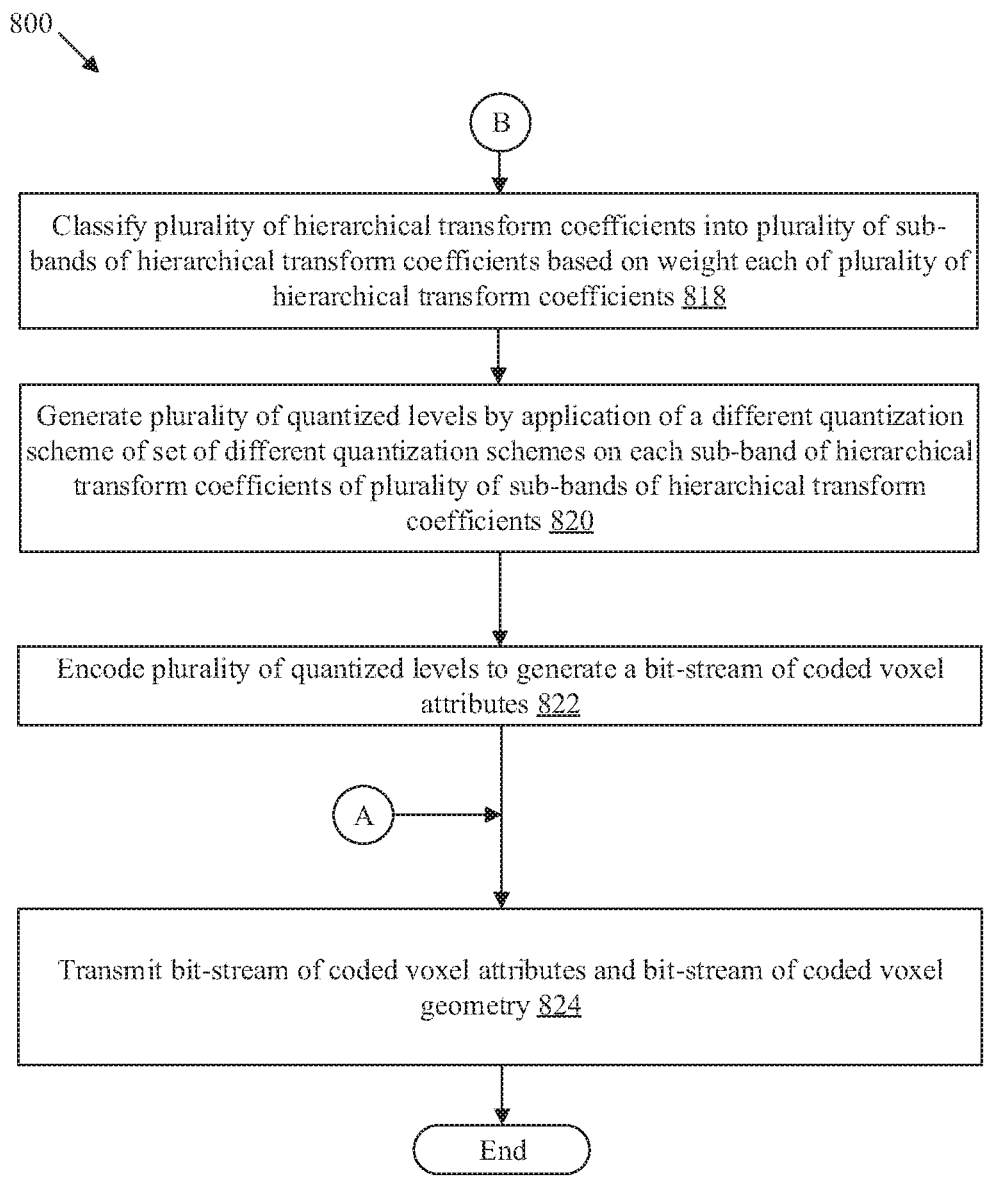

FIGS. 8A and 8B, collectively, depict a flowchart that illustrates exemplary operations for adaptive sub-band based coding of hierarchical transform coefficients of 3D point cloud, in accordance with an embodiment of the disclosure. With reference to FIGS. 8A and 8B, there is shown a flowchart 800. The flowchart 800 is described in conjunction with FIGS. 1, 2, 3A, 3B, 4, 5, 6, 7A, 7B, and 7C. The operations 802 to 822 may be implemented in the electronic apparatus 102. The method described in the flowchart 800 may start at 802 and proceed to 804.

At 804, the 3D point cloud of one or more objects in the 3D space may be generated. The encoder circuitry 206 may be configured to generate the 3D point cloud of one or more objects (such as the object 112) in the 3D space. The operation for generation of the 3D point cloud has been described in detail, for example, in FIGS. 1, 3A, and 3B. At 806, a plurality of voxels may be generated from the 3D point cloud. The encoder circuitry 206 may be configured to generate the plurality of voxels from the 3D point cloud. The voxelization operation is described in detail, for example in FIGS. 3A and 3B.

At 808, a hierarchical data structure may be generated from the plurality of voxels. The encoder circuitry 206 may be configured to generate the hierarchical data structure from the plurality of voxels. The operation for generation of the hierarchical data structure has been described in detail, for example, in FIGS. 3A and 3B.

At 810, a flat geometry code may be generated from the hierarchical data structure. The encoder circuitry 206 may be configured to generate the flat geometry code from the hierarchical data structure. The operation for generation of the flat geometry code has been described in detail, for example, in FIGS. 3A and 3B. At 812, the flat geometry code may be encoded to generate a bit-stream of coded voxel geometry. The encoder circuitry 206 may be configured to generate the bit-stream of coded voxel geometry. The bit-stream of coded voxel geometry may represent geometrical information associated with the 3D point cloud.

At 814, a hierarchical transform scheme may be applied on the plurality of voxels. The encoder circuitry 206 may be configured to apply the hierarchical transform scheme on the plurality of voxels. The application of the hierarchical transform scheme has been described in detail, for example, in FIG. 3B. At 816, a plurality of hierarchical transform coefficients may be generated by application of the hierarchical transform scheme. The encoder circuitry 206 may be configured to generate the plurality of hierarchical transform coefficients by the application of the hierarchical transform scheme on the plurality of voxels. The operation for generation of the plurality of hierarchical transform coefficients has been described in detail, for example, in FIG. 3B.

At 818, the plurality of hierarchical transform coefficients may be classified into a plurality of sub-bands of hierarchical transform coefficients based on the weight of each of the plurality of hierarchical transform coefficients. The encoder circuitry 206 may be configured to classify the plurality of hierarchical transform coefficients into the plurality of sub-bands based on the weight of each of the plurality of hierarchical transform coefficients. The operation for classification plurality of hierarchical transform coefficients in to the plurality of sub-bands has been described in detail, for example, in FIG. 3B.

At 820, a plurality of quantized levels may be generated by application of a different quantization scheme of the set of quantization schemes on each sub-band of hierarchical transform coefficients of the plurality of sub-bands of hierarchical transform coefficients. The encoder circuitry 206 may be configured generate a plurality of quantized levels by application of a different quantization scheme of the set of quantization schemes on each sub-band of hierarchical transform coefficients of the plurality of sub-bands of hierarchical transform coefficients. The operation for the generation of the plurality of quantized levels has been described in detail, for example, in FIG. 3B.

At 822, the plurality of quantized levels may be encoded to generate a bit-stream of codex voxel attributes. The encoder circuitry 206 may be configured encode the plurality of quantized levels to generate the bit-stream of codex voxel attributes.

At 824, the bit-stream of codex voxel attributes and the bit-stream of coded voxel geometry may be transmitted. The encoder circuitry 206 may be configured transmit the bit-stream of codex voxel attributes and the bit-stream of coded voxel geometry to at least the plurality of external device 108A . . . 108N or the decoder circuitry 208. Control passes to the end.

Various embodiments of the disclosure may provide a non-transitory, computer-readable medium and/or storage medium, and/or a non-transitory machine readable medium and/or storage medium stored thereon, instructions executable by a machine and/or a computer that comprises one or more circuits. The instructions may be executable by the machine and/or the computer to perform the steps that include generation of a plurality of voxels from a three-dimensional (3D) point cloud. A plurality of hierarchical transform coefficients may be generated, by application of a hierarchical transform scheme on the generated plurality of voxels. The plurality of hierarchical transform coefficients may be classified into a plurality of sub-bands of hierarchical transform coefficients, based on a weight of each of the plurality of hierarchical transform coefficients. A plurality of quantized levels may be generated, by application of a different quantization scheme of a set of different quantization schemes on each sub-band of hierarchical transform coefficients of the plurality of sub-bands of hierarchical transform coefficients. The generated plurality of quantized levels may be quantized.

Certain embodiments of the disclosure may be found in an electronic apparatus and a method for adaptive sub-band based coding of hierarchical transform coefficients of 3D point cloud. Various embodiments of the disclosure may provide the electronic apparatus 102 (FIG. 1) that may include the memory 210 (FIG. 2)) that may be configured to store a three-dimensional (3D) point cloud that may correspond to at least one object (such as the object 112 (FIG. 1)) in a 3D space. The electronic apparatus 102 may further include the circuitry 202. The circuitry 202 may be configured to generate a plurality of voxels from the 3D point cloud. The circuitry 202 may be further configured to generate a plurality of hierarchical transform coefficients by application of a hierarchical transform scheme on the generated plurality of voxels. The circuitry 202 may be further configured to classify the plurality of hierarchical transform coefficients into a plurality of sub-bands of hierarchical transform coefficients, based on a weight of each of the plurality of hierarchical transform coefficients. The circuitry 202 may be further configured to generate a plurality of quantized levels by application of a different quantization scheme of a set of different quantization schemes on each sub-band of hierarchical transform coefficients of the plurality of sub-bands of hierarchical transform coefficients. The circuitry 202 may be configured to encode the generated plurality of quantized levels.

In accordance with an embodiment, the circuitry 202 may be further configured to generate the 3D point cloud corresponding to the at least one object in the 3D space. The 3D point cloud may be a representation of geometrical information and attribute information of the at least one object in the 3D space. The plurality of hierarchical transform coefficients may be associated with the attribute information of the at least one object. The attribute information may comprise at least one of color information, reflectance information, or texture information of the at least one object. The circuitry 202 may be further configured to generate a hierarchical data structure of the generated plurality of voxels. The hierarchical data structure may sub-divide the 3D space corresponding to the generated plurality of voxels into a plurality of partitions. The circuitry 202 may be configured to generate a flat geometry code that may be indicative of geometrical information of the generated plurality of voxels, based on the generated hierarchical data structure. The circuitry 202 may be further configured to generate a bit-stream of coded voxel geometry by application of an entropy encoding scheme on the flat geometry code. In some embodiments, the generated hierarchical data structure may be an octree. In other embodiments, the hierarchical transform scheme may be a regional adaptive hierarchical transform (RAHT) scheme.

In accordance with an embodiment, the circuitry 202 may be further configured to estimate at least one threshold weight value associated with the plurality of hierarchical transform coefficients. The circuitry 202 may be further configured to compare the weight of each of the plurality of hierarchical transform coefficients with the at least one threshold weight value. The plurality of hierarchical transform coefficients may be classified into the plurality of sub-bands of hierarchical transform coefficients based on the comparison of the weight of each of the plurality of hierarchical transform coefficients with the at least one threshold weight value.

In accordance with an embodiment, the different quantization scheme for one or more sub-bands of hierarchical transform coefficients of the plurality of sub-bands of hierarchical transform coefficients corresponds to a sub-band specific dead zone for the one or more sub-bands of hierarchical transform coefficients.

In accordance with an embodiment, the circuitry 202 may be further configured to assign a sub-band specific dead zone for each of the plurality of sub-bands of hierarchical transform coefficients. The sub-band specific dead zone may be assigned to the different quantization scheme of the set of different quantization schemes. The sub-band specific dead zone may correspond to a range of values in which a quantized level of the plurality of quantized levels for a corresponding hierarchical transform coefficient may be zero.

In accordance with an embodiment, the circuitry 202 may be further configured to assign a zero value to a quantized level for a corresponding hierarchical transform coefficient of the plurality of hierarchical transform coefficients when the corresponding hierarchical transform coefficient may lie in the assigned sub-band specific dead zone. The application of the different quantization scheme of the set of different quantization schemes may be further based on the assigned sub-band specific dead zone for each of the plurality of sub-bands of hierarchical transform coefficients. Each of the plurality of hierarchical transform coefficients may be associated with a color component of a plurality of color components of a color space. The circuitry 202 may be further configured to assign the sub-band specific dead zone based on the color component associated with a corresponding hierarchical transform coefficient of the plurality of sub-bands of hierarchical transform coefficients. The sub-band specific dead zone may be assigned based on at least one threshold weight value associated with the plurality of hierarchical transform coefficients.

In accordance with an embodiment, the circuitry 202 may be further configured to sort the plurality of quantized levels in accordance with an order. The order may be based on the weight for each of the plurality of hierarchical transform coefficients. The circuitry 202 may be further configured to generate a bit-stream of coded voxel attributes by encoding the sorted plurality of quantized levels.

In accordance with an embodiment, the circuitry 202 may be configured to generate a bit-stream of coded voxel attributes by encoding the generated plurality of quantized levels. The circuitry 202 may be further configured to transmit the generated bit-stream of coded voxel attributes to at least one external device (such as the plurality of external devices 108A . . . 108N) or the decoder circuitry 208.

In accordance with an embodiment, the circuitry 202 may further include the decoder circuitry 208 that may be configured to receive the bit-stream of coded voxel attributes. The decoder circuitry 208 may be configured to decode the received bit-stream of coded voxel attributes and reconstruct the one or more objects from the decoded bit-stream of coded voxel attributes.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
a memory configured to store a three-dimensional (3D) point cloud that corresponds to at least one object in a 3D space; and
circuitry configured to:
generate a plurality of voxels from the 3D point cloud;
generate a plurality of hierarchical transform coefficients by application of a hierarchical transform scheme on the generated plurality of voxels;
classify the plurality of hierarchical transform coefficients into a plurality of sub-bands of hierarchical transform coefficients, based on a weight of each of the plurality of hierarchical transform coefficients;
generate a plurality of quantized levels by application of a different quantization scheme of a set of different quantization schemes on each sub-band of hierarchical transform coefficients of the plurality of sub-bands of hierarchical transform coefficients;
assign a sub-band specific dead zone for at least one sub-band of hierarchical transform coefficients of the plurality of sub-bands of hierarchical transform coefficients, wherein
the sub-band specific dead zone is assigned to the different quantization scheme of the set of different quantization schemes, and
the sub-band specific dead zone corresponds to a range of hierarchical transform coefficient values in which a quantized level of the plurality of quantized levels for a corresponding hierarchical transform coefficient of the plurality of hierarchical transform coefficients is zero; and
encode the generated plurality of quantized levels.

2. The electronic apparatus according to claim 1, wherein the circuitry is further configured to generate the 3D point cloud corresponding to the at least one object in the 3D space.

3. The electronic apparatus according to claim 1, wherein
the 3D point cloud is a representation of geometrical information of the at least one object in the 3D space and attribute information of the at least one object in the 3D space, and
the plurality of hierarchical transform coefficients is associated with the attribute information of the at least one object in the 3D space.

4. The electronic apparatus according to claim 3, wherein the attribute information comprises at least one of color information of the at least one object, reflectance information of the at least one object, or texture information of the at least one object.

5. The electronic apparatus according to claim 1, wherein the circuitry is further configured to:
generate a hierarchical data structure of the generated plurality of voxels,
wherein the hierarchical data structure sub-divides the 3D space corresponding to the generated plurality of voxels into a plurality of partitions;
generate, based on the generated hierarchical data structure, a flat geometry code that is an indicative of geometrical information of the generated plurality of voxels; and
generate a bit-stream of coded voxel geometry by application of an entropy encoding scheme on the flat geometry code.

6. The electronic apparatus according to claim 5, wherein the generated hierarchical data structure is an Octree.

7. The electronic apparatus according to claim 1, wherein the hierarchical transform scheme is a regional adaptive hierarchical transform (RAHT) scheme.

8. The electronic apparatus according to claim 1, wherein the circuitry is further configured to:
estimate at least one threshold weight value associated with the plurality of hierarchical transform coefficients; and
compare the weight of each of the plurality of hierarchical transform coefficients with the at least one threshold weight value, wherein
the plurality of hierarchical transform coefficients is classified into the plurality of sub-bands of hierarchical transform coefficients based on the comparison.

9. The electronic apparatus according to claim 1, wherein the sub-band specific dead zone is assigned based on at least one threshold weight value associated with the plurality of hierarchical transform coefficients.

10. The electronic apparatus according to claim 1, wherein the circuitry is further configured to assign a zero value to the quantized level for the corresponding hierarchical transform coefficient of the plurality of hierarchical transform coefficients when the corresponding hierarchical transform coefficient lies in the assigned sub-band specific dead zone.

11. The electronic apparatus according to claim 1, wherein the application of the different quantization scheme of the set of different quantization schemes is further based on the assigned sub-band specific dead zone for the at least one sub-band of hierarchical transform coefficients of the plurality of sub-bands of hierarchical transform coefficients.

12. The electronic apparatus according to claim 1, wherein
each of the plurality of hierarchical transform coefficients is associated with a color component of a plurality of color components of a color space, and the circuitry is further configured to assign the sub-band specific dead zone based on the color component associated with a corresponding hierarchical transform coefficient of the plurality of sub-bands of hierarchical transform coefficients.

13. The electronic apparatus according to claim 1, wherein the circuitry is further configured to:
sort the plurality of quantized levels based on the weight for each of the plurality of hierarchical transform coefficients; and
generate a bit-stream of coded voxel attributes by encoding the sorted plurality of quantized levels.

14. The electronic apparatus according to claim 1, wherein the circuitry is further configured to:
generate a bit-stream of coded voxel attributes based on the encoded plurality of quantized levels; and
transmit the generated bit-stream of coded voxel attributes to at least one external device or a decoder circuitry.

15. The electronic apparatus according to claim 14, wherein the circuitry comprises the decoder circuitry configured to:
receive the bit-stream of coded voxel attributes;
decode the received bit-stream of coded voxel attributes; and
reconstruct the at least one object from the decoded bit-stream of coded voxel attributes.

16. A method, comprising:
in an electronic apparatus:
generating a plurality of voxels from a three-dimensional (3D) point cloud, wherein the 3D point cloud corresponds to at least one object in a 3D space;
generating a plurality of hierarchical transform coefficients by application of a hierarchical transform scheme on the generated plurality of voxels;
classifying the plurality of hierarchical transform coefficients into a plurality of sub-bands of hierarchical transform coefficients, based on a weight of each of the plurality of hierarchical transform coefficients;
generating a plurality of quantized levels by application of a different quantization scheme of a set of different quantization schemes on each sub-band of hierarchical transform coefficients of the plurality of sub-bands of hierarchical transform coefficients;
assigning a sub-band specific dead zone for at least one sub-band of hierarchical transform coefficients of the plurality of sub-bands of hierarchical transform coefficients, wherein
the sub-band specific dead zone is assigned to the different quantization scheme of the set of different quantization schemes, and
the sub-band specific dead zone corresponds to a range of hierarchical transform coefficient values in which a quantized level of the plurality of quantized levels for a corresponding hierarchical transform coefficient of the plurality of hierarchical transform coefficients is zero; and
encoding the generated plurality of quantized levels.

17. The method according to claim 16, further comprising generating the 3D point cloud corresponding to the at least one object in the 3D space.

18. The method according to claim 16, wherein
the 3D point cloud is a 3D representation of geometrical information of the at least one object in the 3D space and attribute information of the at least one object in the 3D space, and
the plurality of hierarchical transform coefficients is associated with the attribute information of the at least one object in the 3D space.

19. An electronic apparatus, comprising:
a memory configured to store a three-dimensional (3D) point cloud that corresponds to at least one object in a 3D space; and
circuitry configured to:
generate a plurality of voxels from the 3D point cloud;
generate a plurality of hierarchical transform coefficients by application of a hierarchical transform scheme on the generated plurality of voxels;
classify the plurality of hierarchical transform coefficients into a plurality of sub-bands of hierarchical transform coefficients, based on a weight of each of the plurality of hierarchical transform coefficients;
generate a plurality of quantized levels by application of a different quantization scheme of a set of different quantization schemes on each sub-band of hierarchical transform coefficients of the plurality of sub-bands of hierarchical transform coefficients;
encode the generated plurality of quantized levels;
generate a hierarchical data structure of the generated plurality of voxels,
wherein the hierarchical data structure sub-divides the 3D space corresponding to the generated plurality of voxels into a plurality of partitions;
generate, based on the generated hierarchical data structure, a flat geometry code that is an indicative of geometrical information of the generated plurality of voxels; and
generate a bit-stream of coded voxel geometry by application of an entropy encoding scheme on the flat geometry code.

\* \* \* \* \*